United States Patent
Chandrashekar

(10) Patent No.: US 12,282,540 B1
(45) Date of Patent: Apr. 22, 2025

(54) VERIFYING SOFTWARE FOR ISOLATED RUNTIME ENVIRONMENTS USING EMULATED SECURITY DEVICES

(71) Applicant: Amazon Technologies, Inc., Seattle, WA (US)

(72) Inventor: Samartha Chandrashekar, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 769 days.

(21) Appl. No.: 17/020,642

(22) Filed: Sep. 14, 2020

(51) Int. Cl.
 *G06F 21/53* (2013.01)
 *G06F 8/65* (2018.01)
 *G06F 9/455* (2018.01)
 *H04L 9/08* (2006.01)

(52) U.S. Cl.
 CPC .......... *G06F 21/53* (2013.01); *G06F 8/65* (2013.01); *G06F 9/45508* (2013.01); *G06F 9/45558* (2013.01); *H04L 9/0877* (2013.01); *H04L 9/0894* (2013.01); *G06F 2009/45587* (2013.01); *G06F 2009/45591* (2013.01); *G06F 2221/033* (2013.01)

(58) Field of Classification Search
 CPC ...... G06F 21/57; G06F 21/575; G06F 21/572; G06F 21/577; G06F 21/51; G06F 21/50; G06F 21/53; G06F 21/52; G06F 21/602; G06F 21/00; G06F 9/455; G06F 9/45558; G06F 9/45545; G06F 9/45541; G06F 9/45533; G06F 2009/45587; G06F 2009/4557; H04L 9/0897; H04L 9/3234; H04L 9/083
 See application file for complete search history.

(56) References Cited

U.S. PATENT DOCUMENTS

| | | | |
|---|---|---|---|
| 8,074,262 B2 | 12/2011 | Scarlata | |
| 8,249,257 B2 | 8/2012 | Brutch et al. | |
| 8,259,948 B2 | 9/2012 | Smith et al. | |
| 8,261,054 B2 | 9/2012 | Smith | |
| 8,356,347 B2 | 1/2013 | Berger et al. | |
| 8,453,236 B2 | 5/2013 | Seifert et al. | |
| 8,549,288 B2 | 10/2013 | Bade et al. | |
| 9,246,690 B1* | 1/2016 | Roth | G06F 21/53 |
| 10,002,247 B2 | 6/2018 | Suarez et al. | |
| 10,104,185 B1 | 10/2018 | Sharifi Mehr | |
| 10,243,739 B1* | 3/2019 | Brandwine | H04L 9/0643 |
| 10,303,879 B1* | 5/2019 | Potlapally | G06F 21/57 |

(Continued)

OTHER PUBLICATIONS

U.S. Appl. No. 16/676,329, filed Nov. 6, 2019, Samartha Chandrashekar.

(Continued)

*Primary Examiner* — Tae K Kim
(74) *Attorney, Agent, or Firm* — Robert C. Kowert; Kowert, Hood, Munyon, Rankin & Goetzel, P.C.

(57) ABSTRACT

An emulated hardware security device is configured for a compute instance. A state descriptor of the compute instance comprising software identification metadata prepared using the emulated hardware security device is provided to a resource verifier. The metadata identifies a program to be executed at the compute instance. In response to a response received from the resource verifier, a decision is made as to whether to execute the software program at the compute instance.

20 Claims, 11 Drawing Sheets

(56) References Cited

U.S. PATENT DOCUMENTS

| | | | |
|---|---|---|---|
| 10,353,726 B2 | 7/2019 | Duan | |
| 10,586,042 B2 | 3/2020 | Stopel et al. | |
| 10,592,678 B1 | 3/2020 | Ismael et al. | |
| 2006/0256108 A1* | 11/2006 | Scaralata | H04L 9/08 345/418 |
| 2007/0282572 A1 | 12/2007 | Larus | |
| 2008/0178176 A1 | 7/2008 | Berger et al. | |
| 2012/0151209 A1* | 6/2012 | Visnyak | H04L 63/105 713/166 |
| 2013/0054948 A1 | 2/2013 | Raj et al. | |
| 2014/0006776 A1* | 1/2014 | Scott-Nash | G06F 21/57 713/189 |
| 2014/0007087 A1* | 1/2014 | Scott-Nash | G06F 21/53 718/1 |
| 2014/0025961 A1* | 1/2014 | Mackintosh | G06F 21/577 713/189 |
| 2014/0095286 A1* | 4/2014 | Drewry | G06Q 30/02 705/14.26 |
| 2015/0007175 A1* | 1/2015 | Potlapally | G06F 12/145 718/1 |
| 2015/0244716 A1* | 8/2015 | Potlapally | H04L 63/0853 713/155 |
| 2015/0365436 A1* | 12/2015 | Shenefiel | H04L 63/123 726/1 |
| 2016/0134623 A1* | 5/2016 | Roth | H04L 63/0823 713/156 |
| 2016/0149912 A1* | 5/2016 | Scott-Nash | H04L 63/0876 713/176 |
| 2017/0024570 A1 | 1/2017 | Pappachan et al. | |
| 2018/0013552 A1* | 1/2018 | Brandwine | H04L 9/0819 |
| 2018/0114000 A1 | 4/2018 | Taylor | |
| 2019/0102555 A1* | 4/2019 | Novak | G06F 21/57 |
| 2019/0332773 A1* | 10/2019 | Konetski | H04L 63/126 |
| 2020/0026857 A1* | 1/2020 | Muller | G06F 21/12 |
| 2021/0132975 A1* | 5/2021 | Chandrashekar | G06F 21/53 |
| 2021/0263759 A1* | 8/2021 | Pascual | H04L 9/3263 |
| 2021/0397698 A1* | 12/2021 | Li | H04L 9/3263 |

OTHER PUBLICATIONS

Paul Sangster et al., "Virtualized Trusted Platform Architecture Specification", dated Sep. 27, 2011, pp. 1-60.

Fengzhe Zhang, "CloudVisor: Retrofitting Protection of Virtual Machines in Multi-tenant Cloud with Nested Virtualization", dated Oct. 23-26, 2011, pp. 1-14.

Min Zhu et al., "HA-VMSI: A Lightweight Virtual Machine Isolation Approach with Commodity Hardware for ARM", dated Apr. 8-9, 2017, pp. 1-15.

AMD, "Secure Encrypted Virtualization API Version 0.16 Technical Preview", Advanced Micro Devices, Publication 55766, Revision 3.06, Feb. 2018. pp. 1-99.

Tai Anati, et al., "Innovative Technology for CPU Based Attestation and Sealing", Retrieved from https://software.intel.com/en-us/articles/innovative-technology-for-cpu-based-attestation-and-sealing on Feb. 9, 2019, pp. 1-19.

U.S. Appl. No. 17/020,634, filed Sep. 14, 2020, Samartha Chandrashekar et al.

U.S. Appl. No. 16/368,747, filed Mar. 27, 2019, Anthony Nicholas Liguori, et al.

U.S. Appl. No. 16/823,198, filed Mar. 17, 2020, Akhil Ramachandran, et al.

Arun Gupta, et al., "Announcing the Firecracker Open Source Technology: Secure and Fast microVM for Serverless Computing", AWS Open Source Blog, Nov. 27, 2018, Source https://aws.amazon.com/blogs/opensource/firecracker-open-source-secure-fast-microvm-serverless/, pp. 1-11.

AWS, "Amazon ECS User Guide for AWS Fargate" API Version Nov. 13, 2013, Revised Jul. 9, 2020, pp. 1-374.

* cited by examiner

Scenario A : User-mode-only eHSMs

Scenario B : Split-mode eHSMs

VERIFYING SOFTWARE FOR ISOLATED RUNTIME ENVIRONMENTS USING EMULATED SECURITY DEVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

In many cases, virtualized resources may be used for applications that access or manipulate sensitive information which has to be protected. For example, financial applications, medical applications and the like may all deal with data sets that are intended to be kept confidential. Security-related artifacts such as cryptographic keys, digital certificates and the like may be utilized to ensure confidentiality and privacy of some applications.

Figure 1:
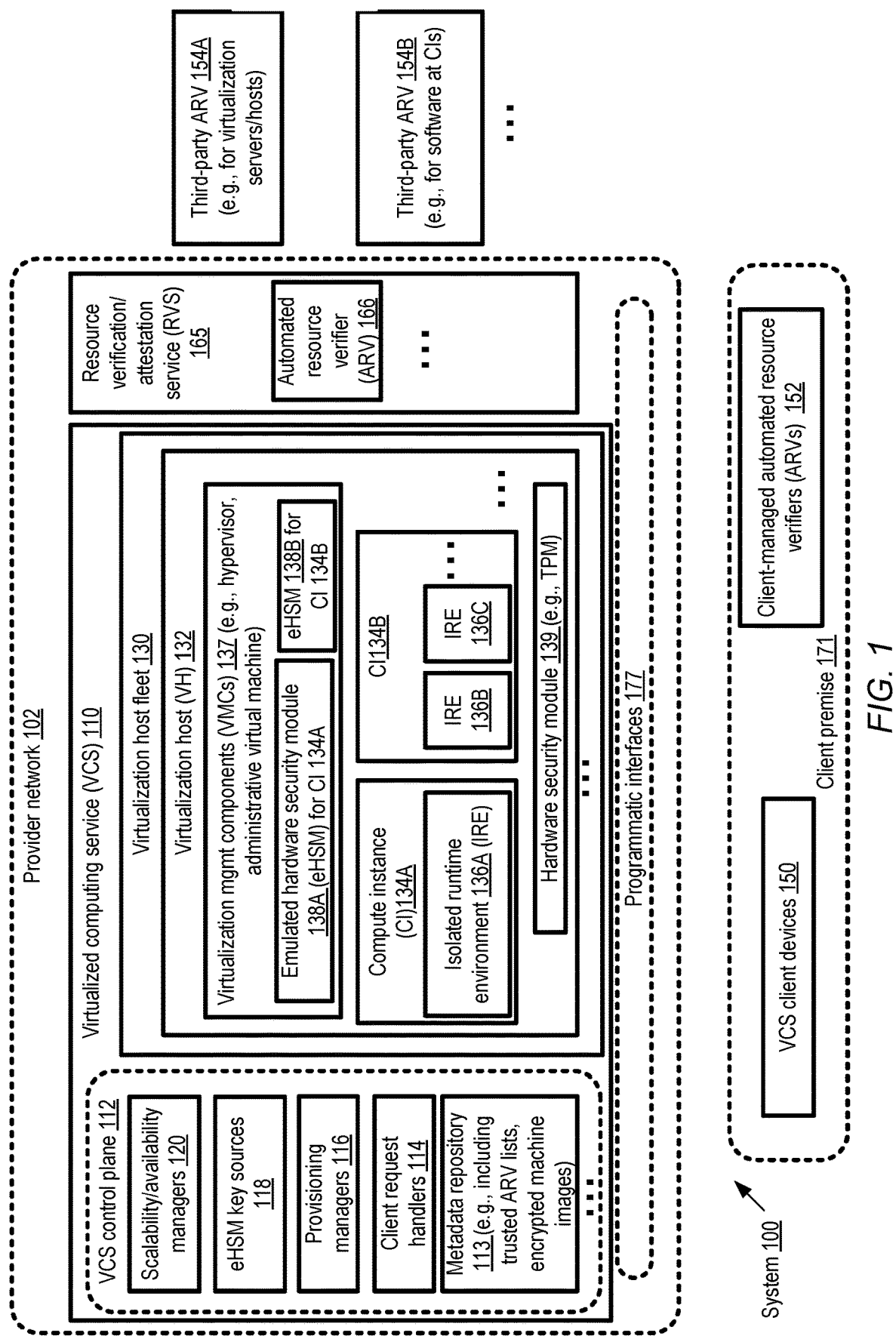
FIG. 1 illustrates an example system environment in which a resource verification procedure using software-emulated security modules may be implemented to ensure the trustworthiness of applications run at isolated runtime environments set up at virtualization hosts of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for verifying, with the help of software-emulated security devices, the trustworthiness of software used for secure computations performed at isolated runtime environments configured using virtualized computing services. Such software-emulated security devices may be referred to as emulated Trusted Platform Modules (eTPMs), emulated hardware security modules (eHSMs), emulated hardware security devices (eHSDs), or virtual TPMs (vTPMs). The isolated runtime environments (IREs) at which secure computations are performed may sometimes be referred to as software enclaves, secure execution environments, or trusted execution environments. Although virtualized computing services may provide a high level of security by default, IREs may typically be established for computations which require an even higher level of trust (e.g., computations implemented using security artifacts such as cryptographic keys that are accessible only within the IREs) than is provided by other types of virtualized computing resources of the virtualized computing services. The use of enclaves to protect in-use data is referred to as confidential computing. Enclaves are designed to execute applications in a protected environment that separates applications and data inside the enclave from the operating system and other applications on the device hosting the enclave. In a cloud computing environment, a cloud-based enclave product can include cryptographic attestation for customer software, so that the customer can be sure that only authorized code is running, as well as integration with a key management service, so that only the enclave can access sensitive material. Further, the cloud-based enclave can be managed by a hypervisor that creates the isolation between an enclave and a corresponding virtual machine instance. Managing a cloud-based enclave using a hypervisor can beneficially enable the creation of enclaves with varying combinations of CPU cores and memory.

A given software enclave or IRE may be linked to a compute instance or guest virtual machine via a secure communication channel, e.g., by virtualization management components (VMCs) of a virtualization host selected for the IRE by administrative components of a virtualized computing service (VCS). The VMCs may for example include a hypervisor and/or an administrative virtual machine. In some cases, a set of resources (such as memory, virtual processors etc.) may initially be reserved by the VMCs for the compute instance, and then a subset of the resources may be assigned for exclusive use by an IRE; in such cases, the compute instance may be referred to as a "parent" compute instance of the IRE. The communication and I/O (input/output) capabilities of the IRE may be restricted in various embodiments for security—e.g., over-the-network communication with entities outside the host being used for the IRE may not be permitted, access to persistent storage devices from the IRE may be prohibited, and so on. A secure local communication channel may be established by the VMCs between the IRE and the compute instance, for example to enable results of secure computations to be provided from the IRE.

For each compute instance launched at a given virtualization host or virtualization server, a set of emulated hardware devices is typically created as part of the initial configuration procedure for the compute instance by the VMCs of the virtualization host. Such a collection of emulated hardware devices may be referred to as a virtual motherboard, as it emulates at least a subset of the hardware devices that would typically be attached to a physical motherboard of the server used for the compute instance. In those scenarios in which an IRE is to be set up using a subset of resources of a given compute instance, an eTPM may also be created as part of the virtual motherboard for the compute instance. If multiple IREs are set up at a given virtualization host, in at least some implementations a respective eTPM may be created for each of the IREs.

The host at which the parent compute instance of an IRE is launched may comprise a physical hardware security device (such as a physical TPM) in at least some cases. If present, such a physical hardware security device may be used to verify the state of the virtualization host (e.g., the hardware of the virtualization host, as well as the software of the VMCs) prior to the launch of the compute instance used for the IRE in some embodiments. For example, messages containing log records of the host startup and the VMC startup, encrypted or signed using a cryptographic key of the physical hardware security device, may be sent to one or more external host resource verifiers or attesters. Then, after the virtualization host state has been approved and the compute instance and the IRE have been started, the state of software within the compute instance and/or the IRE may itself be verified in a separate step using the emulated hardware security device specific to the compute instance. Immutable cryptographic keys assigned to the emulated hardware security device at the time that the emulated device is initialized may, for example, be used to encrypt and/or sign messages containing identification information of the software to be verified, and the messages may be sent to external resource verifiers/attesters selected in advance by the VCS client on whose behalf the IRE was set up. If the identification information provided is acceptable (e.g., if the identification information matches an expected set of identification information stored earlier at the verifier), the external verifier sends a message attesting to the acceptability or trustworthiness of the software. In some cases, the same verifiers/attesters may be used for both steps: attesting that the state of the host is acceptable, as well as attesting that the state of the software running within the compute instance or IRE is acceptable.

The secure computations of the IRE, performed for example using cryptographic keys, programs, or other client-provided security artifacts accessible only within the IRE, may only be initiated if the state of the software has been approved by the external resource verifiers. If multiple IREs are set up at respective compute instances at a single virtualization host, software of each of the different compute instances may be verified independently using respective emulated hardware security devices of the compute instances. From the perspective of the client on whose behalf the IRE is set up, at least two independent levels of assurance regarding the trustworthiness of the resources used may thus be provided in some cases: the virtualization host or server (and its VMCs) may be verified, and the software programs or application components run at the compute instance and/or the IRE may be verified as well. In effect, a chain of trust, rooted at a physical hardware security device of the server, can be created using the combination of the physical and emulated security devices for those VCS clients that wish to utilize such multi-layer security checks. Note that the two types of security devices (physical and emulated) do not necessarily have to be used together. For some VCS clients, the verification/attestation of the virtualization host alone using the physical hardware security device may be sufficient. Other VCS clients may indicate that they only need to verify the software components run for their secure computations, and do not need the virtualization host state verified. A third group of VCS clients may indicate that both types of verification/attestation are to be performed. Virtualization hosts or servers approved by the external verifiers may be referred to as attested hosts, and the compute instances or IREs whose software programs have been approved by external verifiers may be referred to as attested compute instances or IREs.

As one skilled in the art will appreciate in light of this disclosure, certain embodiments may be capable of achieving various advantages, including some or all of the following: (a) providing easy-to-attest evidence regarding the secure configuration of hardware and software for isolated runtime environments to independent entities (such as client-selected resource verifiers) which are not controlled by an operator of a provider network at which the isolated runtime environments are established, (b) substantially enhancing the security of applications that deal with sensitive or confidential data and are run at virtualized computing services, (c) reducing the amount of processing and/or networking resource usage associated with recovery operations (such as revocations of digital certificates, re-generation and re-distribution of encryption keys etc.) resulting from potential or actual compromises of security artifacts, and (d) improving the user experience of clients of virtualized computing services, as well as administrators of applications that are run at such services, by providing clearer insights into the resources used specifically for sensitive data computations.

According to some embodiments, a system may comprise one or more computing devices. The device may include instructions that when executed on or across the one or more computing devices cause the one or more computing devices to obtain, at a virtualized computing service of a provider network, a request to establish an isolated runtime environment to run secure computations on behalf of a client of the virtualized computing service. In response to the request, one or more software emulated devices for a compute instance with which the isolated runtime environment is to be linked or associated via a secure local communication channel (or within which the isolated runtime environment is to be established) may be configured or created. Such emulated devices may be created by one or more virtualization management components of a virtualization server or host selected for the isolated runtime environment. The software emulated devices may include an emulated trusted platform module (eTPM) in various embodiments. Configuration of the eTPM may comprise, among other operations, storing one or more immutable cryptographic keys selected by a key source of the provider network for the emulated TPM in at least some embodiments. Note that in at least some embodiments, the creation of an eTPM or similar software-emulated security module for a compute instance may be triggered by the determination that an IRE is to be associated with the compute instance; in such embodiments, emulation of such security devices may not be required for at least some other types of compute instances which are not to be linked to IREs.

A state descriptor of the compute instance may be provided to one or more attestation services external to the virtualized computing service in various embodiments, e.g., by the virtualization management components of the virtualization server. Such attestation services may represent examples of automated resource verifiers (ARVs) selected by the client on whose behalf the IRE is set up. The state descriptor may include (a) an indicator of an attestation status of the virtualization server as a trusted resource for instantiating the first isolated runtime environment, which was obtained earlier without using the eTPM, and (b) software identification metadata prepared using the eTPM. The software identification metadata may identify one or more applications or programs of a software stack which are to be executed at least in part within the compute instance and/or the IRE, e.g., to help implement the secure computations for which the IRE is established. Such metadata may, for example, comprise at least some portions of log messages generated during early stages of startup of the programs. Subsequent to a receipt of an approval of the state descriptor from the attestation services, the secure computations may be performed, e.g., using the one or more applications or programs.

The virtualized computing service used for the isolated runtime environments may be implemented as part of a suite of services of a cloud provider network (sometimes simply called a "cloud"). The term cloud refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). In some cases, isolated runtime environments or software enclaves of the kind described above may be implemented at services referred to as confidential computing services, confidential cloud services, confidential cloud computing services and the like, and the hardware/software resources used for the software enclaves may be referred to as trusted execution environments.

The state or trustworthiness of any of various kinds of programs/applications or other software components used for performing secure computations may be verified using the eTPM in different embodiments. For example, in some cases the program to be verified may invoke programmatic interfaces of one or more services (other than the VCS itself) to run other client-specified programs or functions. As such, the program to be verified may represent an agent or intermediary layer of such other services. In some embodiments, the program run at the other service may include, for example, (a) a client-specified function run at a server-less event-driven computing service of the provider network, (b) a software container run at a container-based computing service of a provider network, or (c) an analytics program run at an analytics service of the provider network.

In some embodiments, the VMCs of a virtualization host or server at which an IRE is established may comprise an administrative virtual machine (as opposed to the "guest" virtual machines which may be set up on behalf of clients of the VCS. Such an administrative virtual machine or AVM (sometimes referred to as a domain-zero or Dom0 virtual machine) may comprise user-mode layers/subcomponents as well as kernel-mode layers/subcomponents in various embodiments. In at least one embodiment, the emulated hardware security device or eTPM may comprise one or more user-mode data structures of the AVM which may be initialized as part of the process of creating and configuring the eTPM. In other embodiments, at least a portion of the eTPM functionality may be implemented using kernel-mode components of the AVM. In one embodiment, an administrative IRE or enclave may be set up within the AVM, in a manner similar to the way in which IREs for VCS clients are set up within compute instances, and at least a portion of the eTPM functions may be implemented within such an administrative IRE, e.g., using kernel-mode data structures of the AVM.

According to some embodiments, the identification information provided for software programs of the compute instance associated/linked with an IRE, or for software programs of the IRE itself, may include indications of one or more patches or updates which have been applied to the software. In at least some embodiments, patches applied to the operating systems used for the compute instance and/or the IRE may be included in the identification information. In such cases, the verification or attestation procedures may in effect ensure that the latest patches or defect fixes have been applied to the software.

In at least one embodiment, an IRE and its associated compute instance may sometimes be migrated (e.g., as part of a "live" migration which involves zero or near-zero downtime) from one virtualization host (the "source" host) to another (the "destination" host). Such migrations may be initiated for a variety of reasons in different embodiments, e.g., for scheduled maintenance events, workload balancing, and/or in response to migration requests from clients who may wish to relocate several of their compute instances closer to each other for low-latency distributed applications. In some embodiments, prior to such a migration, an encrypted version of at least some state information of the emulated hardware device which was used for verifying the compute instance's state may be stored in the (to-be-migrated) portion of memory of the IRE, so that the state of the emulated hardware device can be safely and securely replicated post-migration at the destination virtualization host. In at least some cases, cryptographic keys used to encrypt the state of the emulated device may be among the set of security artifacts stored within the IRE.

The software in use at the parent compute instance and/or the IRE may be verified several times with the help of the associated eTPM during the lifetime of the IRE in some embodiments. For example, clients may wish to ensure, after pre-selected intervals or at various points in time, that the software running at the parent compute instances and/or at the IRE remains untampered, so the clients may initiate such re-verifications or schedule automated re-verifications.

In some embodiments, a VCS at which IREs can be set up at client request may support several different types of guest virtual machines or compute instances, such as for example standard virtual machines, "micro" virtual machines, and "nano" virtual machines. The different types of virtual machines may differ in properties such as their respective device models (the number and kinds of hardware devices emulated), the number of system calls (syscalls) supported by their operating systems, the maximum amount of memory available, and so on. In at least one such embodiment, an IRE may be implemented using one of the virtual machine types with fewer emulated devices, while its associated/linked compute instance may be implemented using a different virtual machine type with a larger number of emulated devices (including an emulated security device such as an eTPM). In at least one embodiment in which the IRE is implemented as a separate virtual machine than the compute instance to which it is linked via a secure communication channel of the kind mentioned above, a separate emulated security device may be set up for the IRE than is set up for the linked compute instance. In one such scenario, software programs/applications run within the IRE may be verified with the help of the IRE's own emulated security device, while software to be run within the associated/linked compute instance may be verified with the help of the compute instance's emulated security device.

Example System Environment

FIG. 1 illustrates an example system environment in which a resource verification procedure using software-emulated security modules may be implemented to ensure the trustworthiness of applications run at isolated runtime environments set up at virtualization hosts of a provider network, according to at least some embodiments. As shown, system 100 includes various resources of a virtualized computing service (VCS) 110 of a provider network 102, including a virtualization host fleet 130 and a set of administrative components collectively referred to as the VCS control plane in the depicted embodiment. Provider network 102 may also be referred to as a "public cloud" environment, a "cloud provider network", or simply as a "cloud" in some embodiments as mentioned earlier, and the resources of provider network 102 may be distributed among multiple data centers.

The VCS 110 may implement one or more programmatic interfaces 177, including for example one or more web-based consoles, a collection of application programming interfaces (APIs), command line tools, graphical user interfaces and the like. Such interfaces may be utilized from VCS client devices 150 to request various types of configuration operations, receive corresponding responses and the like. For example, programmatic requests to register automated resource verifiers (ARVs) to be used for verifying the trustworthiness or state of a client's compute instances, to launch or instantiate compute instances (CIs) 134, such as CIs 134A or 134B, and/or to set up isolated runtime environments (IREs) 136 (e.g., IRE 136A, 136B, or 136C) may be submitted using interfaces 177. Individual compute instances 134 may comprise respective virtual machines (referred to as guest virtual machines) and/or other types of program execution environments (such as bare-metal instances with direct control granted to more hardware devices than is granted to guest virtual machines) in various embodiments. In the embodiment depicted in FIG. 1, IREs 136 are set up within (e.g., using a subset of resources allocated to) CIs 134, and the CIs 134 may therefore be referred to as "parent" CIs of the IREs. In some embodiments, CIs and associated IREs may be set up using respective distinct virtual machines, e.g., without requiring a subset of the CI resources to be set aside for the IREs.

In order to be enable IREs 136 to be set up at automatically-attested or verified virtualization hosts, and/or to verify software run at the IREs and the associated CIs of the IREs 136, in at least some embodiments a few preliminary operations may be performed in advance. For example, a client may programmatically provide indications (e.g., including network addresses) of one or more automated resource verifiers (ARVs) to be used to confirm, prior to establishing a compute instance 134 with an IRE 136 at a given virtualization host, the configuration or status of the virtualization host. Alternatively or in addition, a client may indicate one or more ARVs to verify the software programs/applications within the CIs 134 and/or the IREs 136. Any combination of a variety of ARVs for host and/or software verification may be indicated programmatically by a client, e.g., including client-managed ARVs 152 (running at client premises such as premise 171), third-party ARVs such as 154A (for verifying virtualization servers) or 154B (for verifying software at CIs 134) running at other resources outside the provider network, and/or ARVs 166 established within a resource verification/attestation service 165 within the provider network itself. In some embodiments, a client may indicate a chain of multiple ARVs, with an associated sequence and timeouts associated with the elements of the chain, so that if one or more of the ARVs of the chain fail to respond in a timely manner to a host verification request, other ARVs of the chain may be consulted.

In response to the information about the client-selected ARV(s), in at least one embodiment the VCS may initiate communications with the ARVs (e.g., using credentials also supplied programmatically by the client for communications with the selected ARVs) and register the ARVs within a trusted ARV list in a metadata repository 113. In one embodiment, during the communication with an ARV to be used for verifying the state of a virtualization host, the VCS may provide examples of the kinds of log records or other evidence that will be supplied to the ARV regarding candidate virtualization hosts, and the ARVs may provide examples of the kinds of approval tokens that the ARVs may send in response to such evidence. Similarly, sources of the software to be verified may provide examples of the kind of identification information which is going to be provided to the software-verifying ARVs, and the ARVs may provide the examples of the kinds of approval tokens that the ARVs may send in response to such evidence. In some embodiments, the preliminary or prerequisite operations needed to enable automated attestation based establishment of IREs may also include the client supplying, to the VCS 110, an encrypted machine image to be used to launch a compute instance within which an IRE can later be set up; such machine images may also be stored in VCS metadata repositories, and may include the software applications/programs to be run at the CIs and the IREs.

In at least some embodiments, the VCS may select virtualization hosts (VHs) which include respective hardware security modules 139 (such as TPMs) for running IREs. Such hardware security modules may be used to prepare the material sent to the ARVs for verifying the state of the virtualization host and the virtualization management components (VMCs) 137 of the virtualization host. VMCs 137 may include, for example, a hypervisor and/or an administrative virtual machine (which may run at a higher privilege level than the compute instances set up for VCS clients at the virtualization host). The VMCs may for example act as intermediaries between the compute instances 134 launched at the VHs and at least some of the hardware elements of the VHs, including for example physical processors (e.g., central processing units (CPUs), graphical processing units (GPUs), etc.), memory, persistent storage devices, networking cards, peripheral devices and the like. In some embodiments, at least a portion of virtualization management responsibilities may be offloaded from the hypervisor to a hardware card (e.g., a card linked to the CPUs of the host via a Peripheral Connect Interface or PCI-Express interconnect) in order to free up more of the computing capacity of the primary processors of the host for compute instances.

In order to enable the software programs/applications run at the CIs and the IREs to be verified, in various embodiments virtualization management components (VMCs) 137 at the virtualization hosts selected by the VCS for IREs may create respective emulated hardware security modules (eHSMs) 138 for each CI 134 at which one or more IREs are to be established (such as eHSM 138A for CI 134A, and eHSM 138B for CI 134B). Such eHSMs may implement similar programmatic interfaces as, and offer similar functionality to, the hardware security module 139 in some embodiments, with the difference being that security keys are stored in software data structures at the eHSMs and the security-related computations are performed at eHSMs using processors other than the dedicated processing elements of the hardware security module 139.

In some embodiments, at least some types of programmatic configuration requests may be directed from VCS client devices 150 to the VCS control plane 112, responsible for administrative operations with regard to VCS resources. The control plane 112 may comprise a number of subcomponents, including one or more client request handlers 114, provisioning managers 116, eHSM key sources 118 (which generate and/or provide unique immutable cryptography keys to each of the eHSMs 138), scalability/availability managers 120, metadata repositories 113 and the like. Each of the control plane components may be implemented using some combination of hardware and software at one or more computing devices in the depicted embodiment. After the preliminary operations mentioned above have been completed, a client may submit a request to set up one or more IREs at one or more attested virtualization hosts 132. Such a request may initially be processed at a request handler 114.

The request handler 114 may perform some initial checking (e.g., to verify that the client has permissions for the kinds of operations being requested), and then pass on internal versions of the request to one or more other components of the control plane for implementation. The provisioning managers 116 may, for example, be responsible for identifying a specific VH 132 at which one or more compute instances are to be launched in the depicted embodiment for the IREs; for example, only hosts which comprise security devices such as hardware security modules 139 may be selected for such compute instances. Scalability and availability managers 120 may be responsible for automatically modifying the configurations of compute instances and other resources, e.g., based on load balancing considerations, increases or decreases in workloads, and so on. In some embodiments, the control plane 112 may also include migration managers that transfer compute instances (along with their isolated runtime environments) between virtualization hosts, e.g., based on analysis of collected metrics and/or based on requests from VCS clients.

To provide evidence for attesting a VH 132, in some embodiments the VCS control plane may cause at least some log records of generated by hardware security module 139 during the startup of the virtualization host and/or the VMCs 137 to be transmitted to a registered ARV pre-selected by the client. The information transmitted to the ARV may for example indicate that a preliminary phase of establishing an IRE has been completed by a hypervisor and/or by some other component of the candidate virtualization host during the startup.

After the client-selected ARV (e.g., an ARV 152, 154 or 166) analyzes and reviews the evidence provided, it may send a host approval token or key to the VCS (e.g., to a VMC 137, and/or to a control plane component of the VCS) in some embodiments, and such an approval indication may then lead to the completion of other phases of the IRE establishment. In some embodiments, before initiating such additional phases, the VCS may verify that the approval indication was received from a trusted ARV which has been pre-registered. In one embodiment, the approval token may comprise a cryptographic key which can be used to decrypt an encrypted machine image to be used to launch the parent compute instance 134 of the IRE 136. A VMC 137 at the virtualization host may launch the parent CI 134 using the decrypted version of the machine image of the parent CI and a set of resources of the virtualization host in various embodiments. The set of resources may include a portion of a memory of the candidate virtualization host, for example. Additional phases of establishment of the IRE may also be performed by the VMC 137 in some embodiments. In such phases, a subset of the first portion of memory may be allocated for exclusive use by the IRE in the additional phase; that is, the subset may be kept inaccessible from programs running outside the IRE. In some embodiments, network communications with endpoints outside the candidate virtualization host may be prohibited from the isolated runtime environment to further enhance the security level of operations performed within the IRE 136.

As mentioned above, the compute instance 134 whose resources are used for the IRE 136 may be referred to as the "parent" compute instance of the IRE, and the IRE may be referred to as a child or dependent runtime environment, logically tightly linked to the parent compute instance. Thus, for example, IRE 136A may be set up with CI 134A as its parent, while CI 134B may be configured as the parent compute instance of IREs 136B and 136C. Note that not all compute instances at the VHs 132 of the VCS 110 may necessarily have child IREs in the depicted embodiment. In at least some embodiments, a variety of compute instance types or categories may be supported at the VCS 110, with some categories enabling IREs to be established if desired at compute instances at pre-attested hosts, others that enable IREs to be established without VH pre-attestation, and yet other categories that do not support IRE instantiation. As indicated in FIG. 1, resources of a given virtualization host 132 may be used for multiple compute instances in at least some embodiments, some of which may be set on behalf of different VCS clients. For example, the two compute instances (134A and 134B) set up at VH 132 may have been established for different VCS clients. Furthermore, respective subsets of resources allocated to a given compute instance may be segregated or carved out for multiple IREs 136 in some scenarios (as in the case of CI 134B, which is the parent of both IRE 136B and IRE 136C). In at least some embodiments, the lifetimes of individual IREs 136 and their parent compute instances (or their peer IREs at the same compute instance) may differ—e.g., it may be the case that IRE 136A is terminated before CI 134A, or that IRE 136B is terminated before IRE 136C in the example scenario shown in FIG. 1. The resources of the parent compute instance that are segregated or set aside for an IRE may not be accessible to programs or processes running at the parent compute instance in at least some embodiments—for example, if 4 gigabytes of a total of 32 gigabytes of memory that was originally allocated to CI 134A is set aside for IRE 136A, programs/processes within CI 134A may only be able to access and use the remaining 28 gigabytes while IRE 136A remains in existence.

When configuring or instantiating an IRE 136, in various embodiments a number of constraints may be enforced to limit the manner in which programs or processes within the IRE can communicate or interact with other entities (e.g., processes/programs running in the parent compute instance, or outside the parent compute instance). In at least one embodiment, for example, an IRE process/program may be prohibited from over-the-wire networking communications with any entities outside the IRE (e.g., by not configuring virtual or physical network interfaces accessible from the IRE). Similarly, in various embodiments, IREs 136 may be configured such that access to persistent storage devices and/or file systems is prohibited—that is, processes/programs within an IRE 136 may not be able to perform reads or writes to persistent storage. In some embodiments, one or more communication intermediary processes (CIPs) or daemons may be instantiated in the parent compute instance of an IRE, which are permitted to use a local communication channel to communicate with the IRE on behalf of other processes/programs inside or outside the parent compute instance. For example, in some embodiments one or more buffers of shared memory, mapped to both a CIP and an IRE, may be used for such communications. In at least some such embodiments, an interrupt-based or notification-based communication technique may be used for bidirectional communications between a CIP and an IRE—e.g., a notification may be generated by the CIP when a message is ready for the IRE, and similar notifications may be used to indicate when the IRE has finished reading the buffers, when the IRE has an outbound message ready in a buffer, when the CIP has finished transmitting that outbound message, and so on. In some embodiments, such a communication mechanism may be referred to as a "doorbell" mechanism.

In at least some embodiments, one or more types of triggering conditions may lead to the attestation of the programs/applications to be run within a parent CI 134 or an IRE 136. One such triggering condition may be detected when the first attempt to run one of the to-be-attested programs/applications within the CI or IRE is made, for example; a reception of a request from a client for re-attestation may represent another example of a triggering condition. In response to the triggering condition, a state descriptor of the parent CI of the IRE may be prepared and transmitted to an ARV selected in advance by the client on whose behalf the IRE is set up in various embodiments. The state descriptor may, for example, include (a) an indicator of an attestation status of the VH at which the parent CI is running (e.g., if the VH state has been approved/attested by a resource verifier, when such an approval was last obtained, etc.) and (b) software identification metadata prepared using the eHSM created for the parent CI. The attestation status of the VH 132 may have been obtained earlier, even before the eHSM was created for the parent CI, and stored (e.g., at the VMCs and/or at the VCS control plane 112). The software identification metadata may, for example, include startup log records and/or executable file signatures identifying one or more applications to be executed at least in part within the CI. If the ARV approves the state of the parent CI by providing an affirmative attestation, the applications/programs indicated in the state descriptor may be allowed to run at the parent CI and/or the IRE in the depicted embodiment. In at least some embodiments, indications of software patches which have been applied to one or more applications/programs may be included in the state descriptor. If the state descriptor is found unacceptable, the ARV may reject the applications/programs, and the VMCs 137 may ensure that execution of the applications/programs is not permitted to proceed.

After the client on whose behalf the IRE is established is satisfied regarding the trustworthiness of the IRE and its software/hardware environment, one or more security artifacts (e.g., cryptographic keys that are to be used for computations of one or more applications on behalf of the client at the IRE) may be securely transmitted if needed to the IRE in various embodiments. A mechanism that does not allow unencrypted versions of the security artifacts to be intercepted or accessed by any parties other than the client supplying the artifact and the IRE itself may be employed in such embodiments. In some embodiments, for example, the logical equivalent of a TLS (Transport Layer Security) session may be set up between a client and the IRE, and the security artifacts may be encrypted using a shared secret key determined/generated by both the IRE and the client during the session. Note that even though the encrypted version of an artifact may pass through the communication intermediary process (CIP) on its way to the IRE from the client, the CIP may not have the shared secret key needed to decrypt the artifact in various embodiments. The decrypted version of the artifact may be generated within the IRE using the shared secret key in at least some embodiments. In some implementations, the security artifacts may be included in a machine image used for the IRE, and may not have to be transmitted to the IRE from external sources.

After the security artifact(s) have been obtained within the IRE, requests to perform computations on behalf of the client using the artifact(s) may be conveyed to the IRE by the CIP, e.g., from other processes/programs (which may have been attested) within the parent compute instance in various embodiments. Consider an example scenario in which portions or all of a digital media object (such as a video or an audio recording) are to be transformed or processed using a security artifact on behalf of a media distribution application. A request to perform the transformations may be passed to the IRE from an application process running in the parent compute instance, along with the digital media object itself, via the CIP in this example scenario. The transformations may be implemented at the IRE using the security artifact, and the results may be provided to the application process via the CIP. In this example scenario, the security artifact may be used within the IRE to achieve the computation objectives of the application, without ever being exposed to any other processes or programs outside the IRE at the virtualization host. In at least some embodiments, after the secure computations needed from an IRE are completed, the IRE may be terminated, and the resources that were earlier segregated away from the parent compute instance may be returned to the parent compute instance.

In some embodiments, the VCS 110 may provide, e.g., via programmatic interfaces 177, source code and/or other artifacts that can be used by a VCS client (or third parties) to implement an ARV. For example, a representation of a reference implementation of an ARV may be provided to clients and other interested parties, such that ARVs which comply with a set of expected application programming interfaces of the VCS can be established at various resources outside the provider network, and customized to meet client's particular host attestation requirements as needed.

In at least one embodiment, host attestation as well as compute instance software attestation using client-selected ARVs may be performed at several points during the lifetime of a virtualization host, an IRE and/or its parent compute instance. For example, such attestation may be performed when a parent compute instance is stopped/terminated/restarted/migrated, and/or when the virtualization host itself is restarted or rebooted. In at least one embodiment, a client may specify the set of operation types for which host and/or CI attestation is required—e.g., whether attestation is only required for initial launch of an IRE and migrations of the IRE, or whether attestation is required any time the host reboots, etc. In some embodiments, the VCS may support a programmatic interface that can be used for on-demand host or CI attestation—e.g., a client may request that the configuration of a virtualization host being used for the client be attested by an ARV at any desired point in time.

Example IRE Establishment and Use

Figure 2:
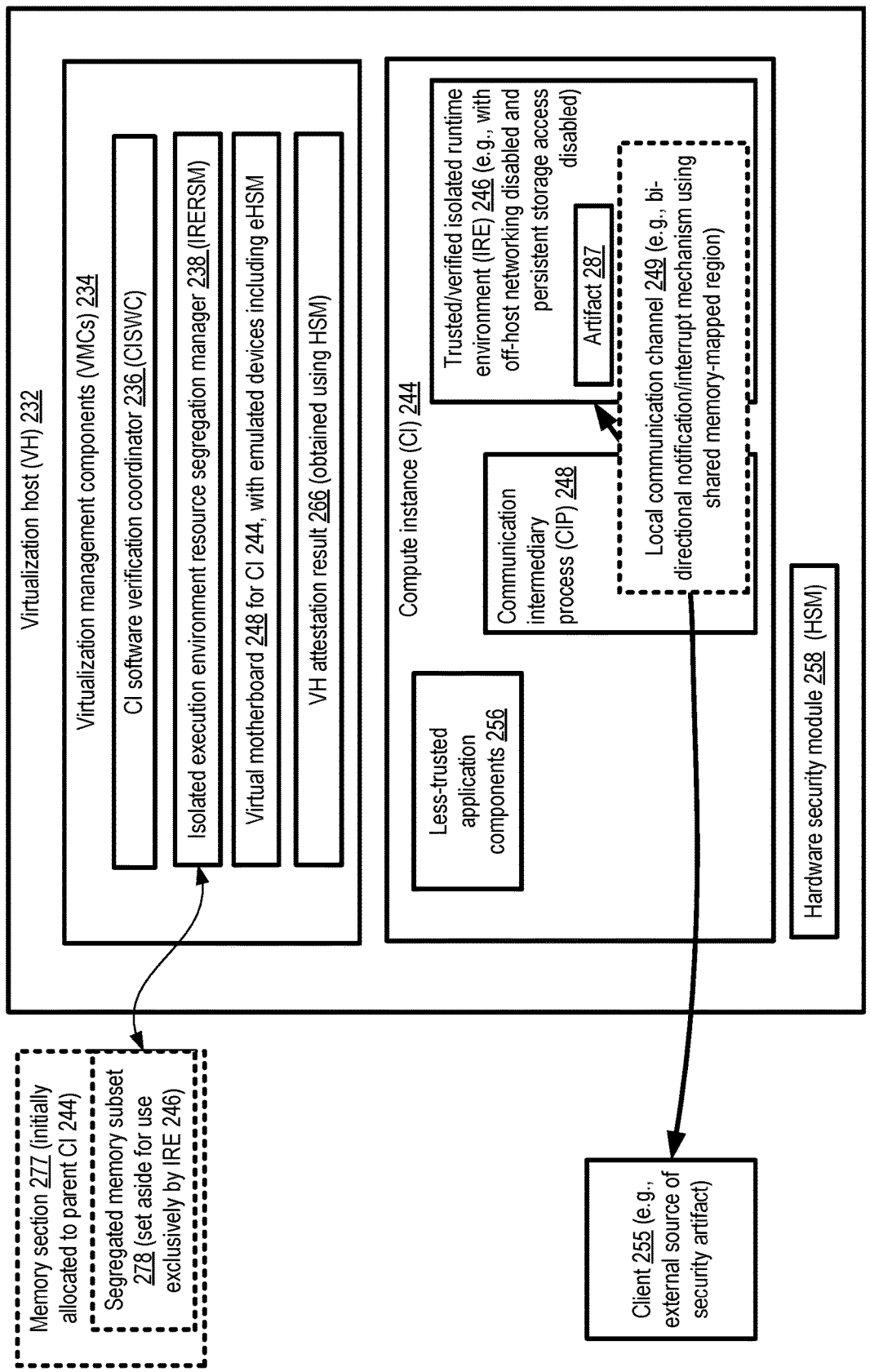
FIG. 2 illustrates aspects of an example isolated runtime environment established within a compute instance at a virtualization host, according to at least some embodiments.

FIG. 2 illustrates aspects of an example isolated runtime environment established within a compute instance at a virtualization host, according to at least some embodiments. In the depicted embodiment, a client 255 may submit a request to instantiate a compute instance with an IRE, e.g., to the control plane of a virtualized computing service (VCS) similar to VCS 110 of FIG. 1, resulting in the establishment of compute instance 244 at a selected virtualization host 232 equipped with a hardware security module 258 (HSM) such as a physical TPM. Prior to the launch of the compute instance 244, information about the state of the VH 232 (such as log records generated during boot or startup of the VH and/or its VMCs 234) may be prepared with the help of HSM 258 and provided to an external host verifier selected by the client. After the VH state is attested or approved, the CI 244 may be started up in the depicted embodiment. A record of the attestation of the VH may be stored at the VMCs, e.g., in a data structure referred to as VH attestation result 266 in at least some embodiments.

Either based on parameters of the request to launch the compute instance itself, or based on a separate programmatic request, an isolated runtime environment (IRE) 246 may be set up in various embodiments, with some of the resources that were earlier allocated to the compute instance 244 (the "parent" compute instance of the IRE) being carved out or segregated for exclusive use by the IRE. In various embodiments, the client may indicate at least a portion of the desired software stack to be used at the IRE, e.g., by providing an executable image (such as a separate virtual machine image) for the IRE itself, by selecting from a set of software stacks supported by the VCS, and so on.

Virtualization management components 234 of the virtualization host 232 may include an IRE resource segregation manager (IRERSM) 238 responsible for identifying resources to be configured for exclusive use by the IRE (by threads or processes launched within the IRE) in at least some embodiments. For example, from the memory section 277 initially allocated to the parent compute instance 244, the IRERSM 238 may select or identify a memory subset 278 for exclusive use by the IRE; as and when additional IREs are set up within the same parent CI, the IRERSM 238 may set aside respective additional subsets exclusively for such IREs. The segregated memory may not be accessible to processes/programs running within the parent CI after it has been configured for IRE use in such embodiments. A subset of other resources, such as virtual CPUs that may have been designated for use by the parent compute instance 244, may also be designated for exclusive use by the IRE in some embodiments.

Within the compute instance, a communication intermediary process (CIP) 248 may be instantiated in various embodiments. An operating system daemon may be used as the CIP in some embodiments. In one embodiment, such a CIP daemon may be established as part of the procedure of establishing the IRE 246; in other embodiments, the CIP daemon may be started up as part of the initialization or boot sequence of the parent compute instance 244, or in response to invocation of an API after the compute instance has booted. The CIP 248 may be configured to transfer data to the IRE 246 from any other entities that wish to communicate with the IRE (e.g., including the client 255), and to transfer outbound data from the IRE 246 to one or more destinations (e.g., including the client 255) in various embodiments. As part of the configuration steps to ensure the isolation of the IRE from any external entities (e.g., other than the VMCs 234), processes/programs of the IRE 246 may not be permitted to transfer data to any entity or endpoint over a network connection that uses a network interface card of the virtualization host in at least some embodiments; all communications to/from the IRE may have to pass through the CIP in such embodiments. Similarly, in some embodiments configuration settings of the IRE 246 may also prohibit interactions between the IRE and persistent storage, and between the IRE 246 and a file system—that is, reads from and writes to persistent storage may not be permitted from processes/programs of the IRE in such embodiments. A local communication channel 249 may be set up for data transfers between the CIP and the IRE in at least some embodiments. For example, a portion of shared memory which is accessible to both the CIP and the IRE may be designated to store data being transferred in/out of the IRE in one embodiment. A bi-directional notification or interrupt-based mechanism may be used to indicate when data is ready to be read by the IRE (for data inbound to the IRE) or read by the CIP (for data outbound from the IRE) in some embodiments. The compute instance 244 may comprise various other processes/programs such as application components 256 and/or operating system components of the compute instance, which may be less trusted (from the perspective of the client) than the IRE with respect to performing computations using security artifacts such as cryptographic keys in the depicted embodiment. Note that even though components 256 may be less trusted than the software run within the IRE 246 itself, a client 255 may nevertheless wish to ensure that the versions of software run at compute instances 244 (including components 256 as well as software run within IRE 246) are approved by an external attester/verifier, In the embodiment depicted in FIG. 2, interactions pertaining to the verification/attestation of software applications/programs running within the CI 244 and the IRE 246 may be coordinated by CI software verification coordinator 236 (CISWC). For example, in some embodiments, whenever the first attempt (after the establishment of the CI 244) to run one of the application components 256 (or to run some application or program within IRE 246) is made, the CISWC may cause a state descriptor of the CI 244's software to be created and transmitted to an external verifier pre-selected by the client 255. The virtual motherboard 248 set up for CI 244 may include an emulated hardware security module or eHSM with a set of immutable cryptographic keys which were selected/assigned specifically for CI 244's eHSM in the depicted embodiment. At least a portion of the state descriptor may be prepared with the help of the eHSM (e.g., using hash functions implemented at the eHSM, encrypted using keys stored at the eHSM, digitally signed using keys stored at the eHSM, etc.). The state descriptor may for example, include log records generated by the programs to be verified (e.g., when an attempt to run the programs was made) and/or other identification metadata (e.g., results of applying hash functions by the eHSM to the program executables) of the programs in some embodiments. The state descriptor may be sent to an external attestation service or verifier, and the CISWC 234 may ensure that the programs are run only after a message confirming or attesting to their acceptability has been received at the CISWC in the depicted embodiment. For example, further execution of a program at CI 244 or IRE 246 may be blocked until a decryption key is received for the program at the CISWC from the external verifier. In at least some embodiments, the information set to the external verifier may include a representation of the VH attestation result 266, and the external verifier may use the VH attestation result in making its determination of whether to approve the environment in which the IRE's secure computations are to be implemented; thus, a chain of trust may rooted at the HSM may in effect be established.

To enable secure computations at the IRE to be implemented on behalf of the client, one or more security artifacts 287 may be transferred from the client (or from some other source selected by the client) to the IRE 246 for some types of applications after the software of CI 244 has been attested/approved. In order to do so, a secure communication session or channel, similar to a TLS session, may be established between the client (and some other artifact source) and the IRE in various embodiments. Within the compute instance 244, the CIP and local communication channel 249 may be used for such a secure session. Using one or more messages of the session, an encrypted version of the security artifact(s) 287, which cannot be decrypted by the CIP even though the CIP passes on the messages of the session to/from the IRE, may be transferred safely to the IRE 246. The IRE 246 may then begin performing computations using the artifact(s) 287. In some cases, security artifacts 287 may not be needed for at least some of the applications run at an IRE.

Example Interaction Sequence for Multi-Level Attestation

Figure 3:
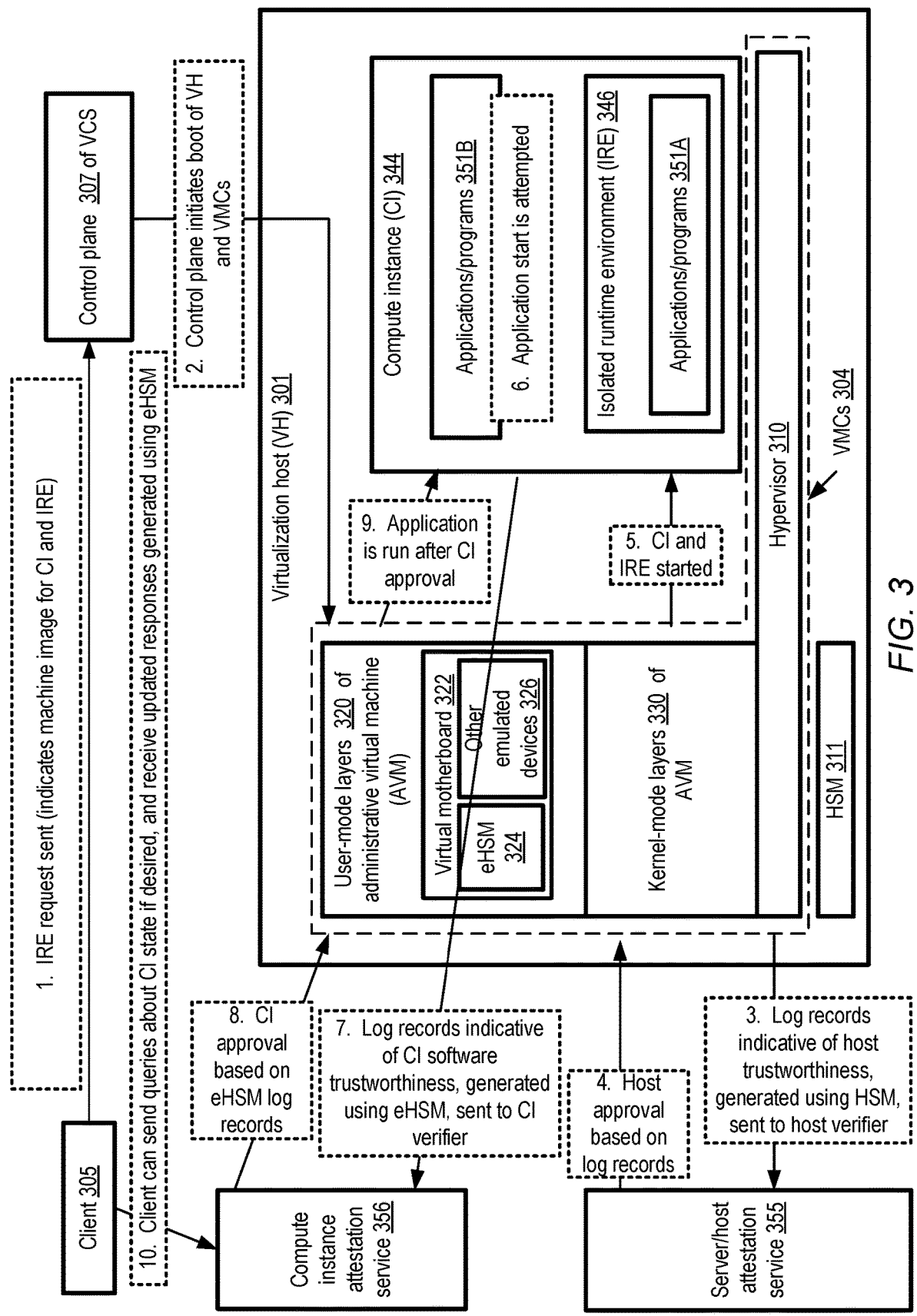
FIG. 3 illustrates example interactions involved in verifying the hardware and software used for computations performed at an isolated runtime environment, according to at least some embodiments.

FIG. 3 illustrates example interactions involved in verifying the hardware and software used for computations performed at an isolated runtime environment, according to at least some embodiments. A client 305 of a VCS may send a programmatic request indicating that an IRE is to be set up to a control plane 307 of the VCS in the depicted embodiment, as indicated in the interaction labeled "1" at the top of FIG. 3. The IRE establishment request may, for example, include a machine image to be used for a compute instance (CI) to be associated with the IRE. The control plane 307 may select a particular virtualization host b301 for the IRE based on a variety of factors, such as the utilization level of CPUs and other resources within the host, the type of hardware and virtualization management components the host has, and so on.

In the depicted embodiment, selected virtualization host (VH) 301's virtualization management components (VMCs) 304 include a hypervisor 310 and an administrative virtual machine (AVM). The AVM comprises user-mode layers 320 and kernel-mode layers 330. The VH 301 also comprises a hardware security module (HSM) 311; in at least some embodiments, depending on the security requirements of the client 305, only hosts that comprise such HSMs may be selected for implementing IREs.

As indicated by the interaction labeled "2", the control plane may initiate a boot of the selected VH 301 and its VMCs 304. During the early stages of the initialization of the VH and its VMCs, a set of log records indicative of the host health status and/or trustworthiness may be generated using HSM 311 in the depicted embodiment. As indicated in the interaction labeled "3", such log records may be sent to a server/host attestation service external to the VCS in the depicted embodiment, e.g., by the VCS control plane and/or by components of the VMCs 304. In some embodiments, additional information about the VH and/or VMCs in addition to log records may be sent. In some embodiments, the log records may be formatted in accordance with a widely-accepted standard or specification such as a TCG (Trusted Computing Group) standard or specification.

If the log records are found acceptable by the attestation service 355, a host approval message may be sent as indicated in the interaction labeled "4" in FIG. 3. Such an approval may lead to the completion of the startup of the CI 344 and its associated IRE 346, as indicated in interaction "5". In at least some embodiments, a key to be used to decrypt the machine image used for the CI 344 and/or the IRE 346 may be included in the approval message. As part of the configuration of CI 344 which is to be associated with an IRE 346, a virtual motherboard 322 comprising an eHSM (emulated hardware security module) as well as other emulated devices 326 may be created within the user-mode layers 320 of the administrative virtual machine of VMCs 304 in the depicted embodiment. The CI 344 may comprise a software stack including one or more applications/programs 351B which are to be verified/attested and the IRE 346 may comprise one or more other applications/programs 351A which are also to be verified/attested.

When an attempt to start one of the programs 351B (or 351A) is made, as indicated by the label "6" in FIG. 3, this may trigger the preparation of a software state descriptor of the CI 344 and/or the IRE 346 in the depicted embodiment. Such an application start attempt may occur, for example, in response to a request or message received from the client at the CI 344. In at least some embodiments, the applications/programs 351 may be written to implement the following verification procedure: upon an attempt to invoke or run the program, a small portion of code which generates identification information of the program may be executed, and then the program may block its further execution until a key (obtained for example from an attestation service) is provided to the program. A state descriptor comprising log records indicative of the CI software stack's trustworthiness, e.g., including version numbers and other identifying information of applications/programs 351 may be prepared or generated using the eHSM 324 in the depicted embodiment and sent to a compute instance attestation service 356, as indicated by interaction "7" in FIG. 3. In at least some embodiments, the information sent to the compute instance attestation service 356 may include evidence of the earlier attestation of the host 301 by attestation service 355.

The attestation service 356 may examine the provided information and make a determination as to whether to approve or disapprove of the software 351 in the depicted embodiment. A message indicating approval of the CI may be sent back to the VH 301, as indicated in interaction "8", if the information is found acceptable. The application(s) 351 may then be run at the CI, as indicated by the interaction labeled "9". After the applications have started running, in at least some embodiments the client 305 may send subsequent requests or queries to re-verify or re-attest the state of the CI 344 (and/or the state of the VH 301), as indicated by the interaction labeled "10". Such requests may be sent to the VCS control plane in some cases, and/or to the compute instance attestation service 356 in various embodiments. In response, the VMCs may be notified that renewed attestation is required, state descriptors of the CI may be re-generated using the eHSM 324 and provided to the attestation service 356, and the state of the CI may be re-checked based on the newly-generated state descriptors in various embodiments. The results of the re-attestation may be provided to the client 305 and/or to the VMCs 304 in various embodiments. If the attestation service determines that the software state of the CI 344 is no longer acceptable (e.g., if the applications/programs 351 do not contain some recently-created updates/patches), execution of the programs (or the entire IRE or CI) may be paused or terminated by the VMCs in one implementation.

Example Implementations of Emulated Security Devices

Figure 4:
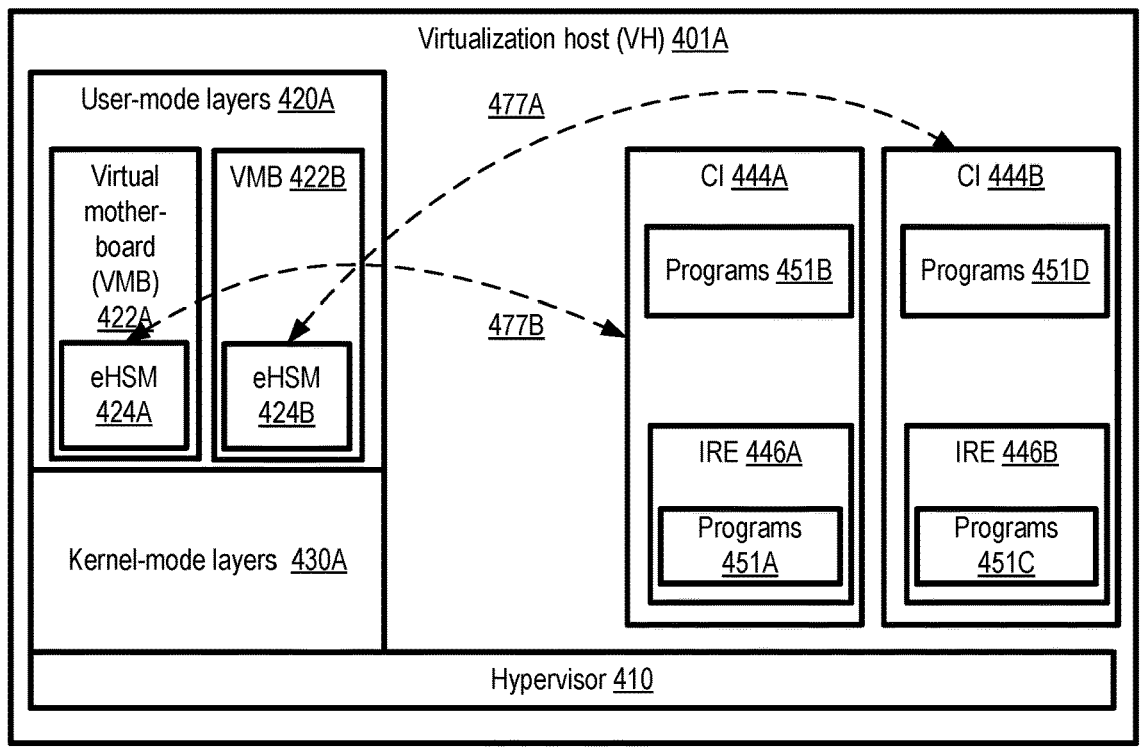
FIG. 4 illustrates example alternate implementations of emulated hardware security devices at virtualization hosts, according to at least some embodiments.
Figure 4:
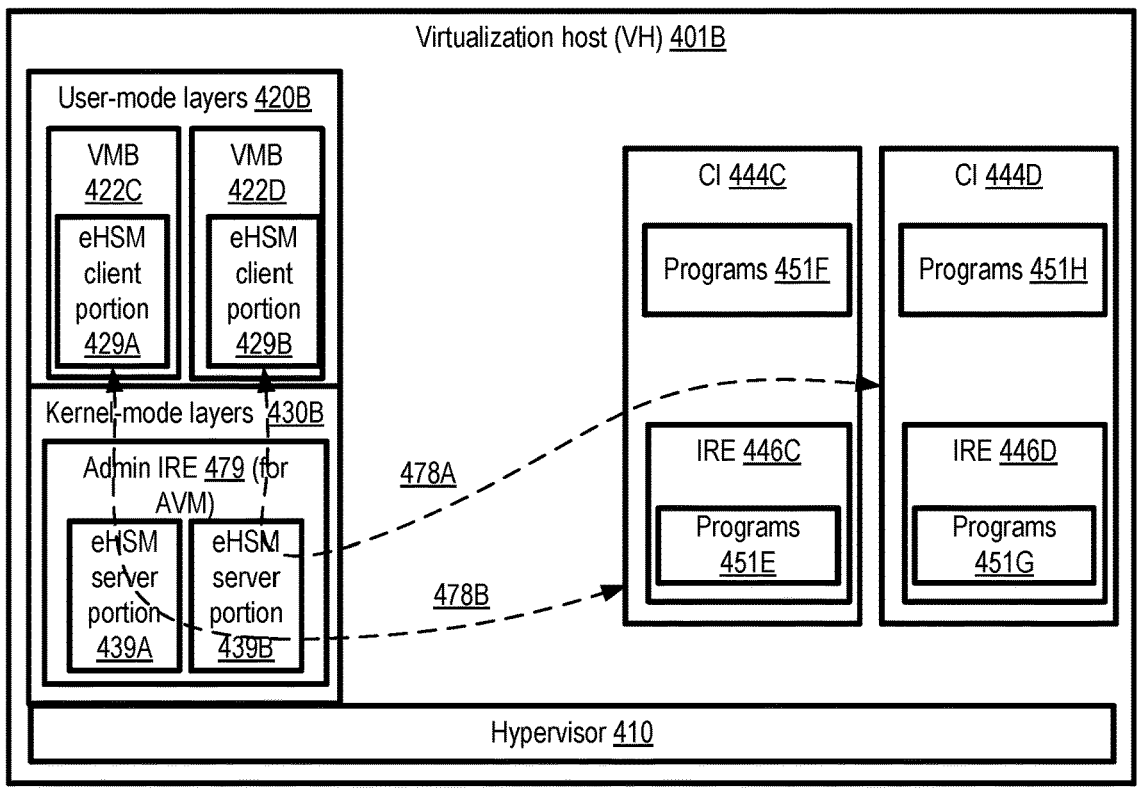

FIG. 4 illustrates example alternate implementations of emulated hardware security devices at virtualization hosts, according to at least some embodiments. In Scenario A, emulated hardware security modules may be implemented entirely in the user-mode layers 420A of an administrative virtual machine of the virtualization management components of a virtualization host (VH) 401A. The virtualization management components may also comprise kernel-mode layers 430A and a hypervisor 410 in the depicted embodiment. If multiple CIs such as 444A and 444B with associated IREs (such as IREs 446A and 446B) are configured at a given VH 401, respective eHSMs 424A and 424B may be created within respective virtual motherboards (VMBs) 422A and 422B set up for the CIs. Thus, for example, eHSM 424A established for CI 444A and its associated IRE 446A may be used in the attestation/verification procedure (similar to the procedure illustrated in FIG. 3) for programs 451A and/or 451B as indicated by arrow 477B, while eHSM 424B established for CI 444B and its associated IRE 446B may be used in the attestation/verification procedure for programs 451C and/or 451D as indicated by arrow 477A.

In an alternative approach labeled Scenario B in FIG. 4, the functionality of the eHSMs may be split into two parts: a client portion and a server portion. The client portion of the eHSM functionality may be implemented using data structures and/or logic running in the user-mode layers 420B of the administrative VM (AVM) of VH 401B, while the server portion may be implemented using data structures and/or logic running in the kernel-mode layers 430B. In at least one embodiment, an administrative IRE 479 may be set up at the kernel-model layers 430B, providing similar levels of isolation and security with respect to the AVM as are provided by IREs with respect to their respective associated CIs. In the depicted example, CIs 444C and 444D are run at VH 401B. Corresponding to CI 444C, eHSM server portion 439A and eHSM client portion 429A may be run within admin IRE 479 and VMB 422C respectively. Similarly, corresponding to CI 444D, eHSM server portion 439B and eHSM client portion 429B may be run within admin IRE 479 and VMB 422D respectively. The server portions 430 may, for example, be used to store the unique cryptographic keys of the eHSM, and perform cryptographic operations using the keys in response to requests from the client portions 429. Thus, for example, if a signed version of some data (e.g., log records of the kinds discussed earlier) is to be generated using eHSM functionality for CI 444C, a request for the signed version may be sent to the eHSM client portion 429A from the requester of the signed version (such as some other component of the VMCs), and the request may be forwarded to the server portion 439A by the client portion 429A. The signed version may be prepared by the server portion in the enhanced-security environment of IRE 479, and sent back to the client portion 429A for forwarding to the requester. As indicated by arrow 478A, eHSM client portion 429B and eHSM server portion 439B may be used collectively in the attestation procedure for programs 451H and 451G of CI 444D and IRE 446. As indicated by arrow 478B, eHSM client portion 429A and eHSM server portion 439A may be used collectively in the attestation procedure for programs 451F and 451E of CI 444C and IRE 446C. Performing some of the eHSM functions within an IRE or on kernel mode may provide an even higher level of security than if only user-mode components are used in some embodiments. In at least one embodiment, all of the functionality of an eHSM may be implemented entirely in kernel-mode or within an administrative IRE.

Example Programs Verified Using Emulated Security Devices

Figure 5:
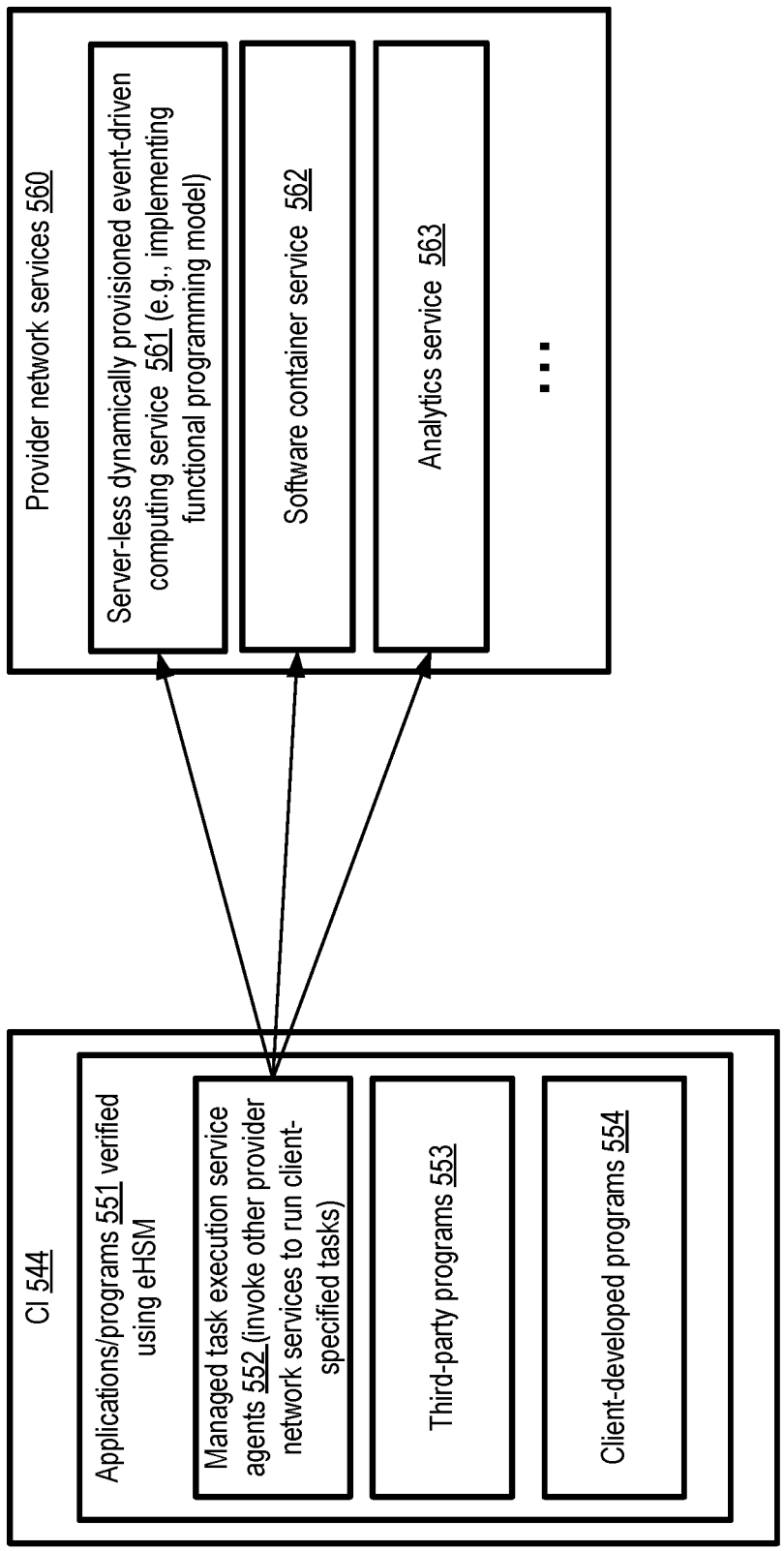
FIG. 5 illustrates examples of programs which may be verified with the help of emulated hardware security devices, according to at least some embodiments.

FIG. 5 illustrates examples of programs which may be verified with the help of emulated hardware security devices, according to at least some embodiments. A software stack of a compute instance (CI) 544 and/or its associated isolated runtime environment (IRE) may comprise, among other types of programs, one or more managed task execution service agents 552, third-party programs 553, and client-developed programs 554. Before using any of these types of applications/programs 551, a client may wish to verify that the versions of the programs at the CI 544 are legitimate and appropriately patched/updated in various embodiments. Techniques of the kind introduced above, which utilize emulated hardware security modules in the attestation procedure, may be employed for any or all of at least these three categories of programs.

A provider network or cloud computing environment may implement a variety of services at which tasks indicated by provider network clients can be executed, e.g., without requiring the clients to launch compute instances for the tasks. For example, in some embodiments, a server-less dynamically-provisioned event-driven computing service 561 may be provided at a provider network. Such a service may implement a functional programming model, such that instead of selecting or acquiring computing resources first and then running desired tasks at the resources, clients may simply provide a representation of the logic or function of a program that is to be executed for a task to the service. The server-less dynamically provisioned event-driven computing service may select appropriate resources for executing the function, cause the function to be executed at the appropriate resources, and provide results to the client (or to another function) when the results become available, without even informing the client about the resources that are used. A software container service 562 may be implemented at a provider network in some embodiments, enabling clients to run software containers comprising programs selected by the clients in advance, again without requiring the clients to select or acquire particular computing resources for their containers. In at least one embodiment, a provider network may provide an analytics service 563 at which various machine learning tasks/programs or statistics-related tasks/programs can be run, for example on dynamically-generated streaming data records, without requiring resources to be selected in advance by the client for the tasks. The illustrated provider network services 560 may be referred to as "managed task execution services", as they eliminate the burden of resource selection and acquisition for task executions of various kinds.

In at least some embodiments, some of the operations performed at a CI 544 with an associated IRE may involve invoking such services—for example, a result of a secure computation performed at an IRE using a cryptographic key may be further processed at a software container selected by the client and run using service 562, or provided as part of the input for an analytics task run using service 563. In such scenarios, respective agents 552 may have to be present at the CI 544 to request the execution of the tasks from the managed task execution services, e.g., by invoking programmatic interfaces such as APIs of the services. Before entrusting such agents with the tasks, which may be part of critical business functions in some cases, clients may wish to ensure that the agent software has the latest bug fixes and can be considered safe to use in various embodiments, and an attestation procedure similar to that described above may be employed for the software of agents 552.

Third-party programs 553, developed and provided by entities external to the provider network, which may in some cases invoke services external to the provider network, may be utilized for some applications at the CI 344 in various embodiments. The state of these third-party programs (e.g., whether they contain the latest updates available) may also be verified before use in at least some embodiments using the attestation procedure. In some cases, the state of client-developed programs 554 may also be verified using the attestation technique, e.g., in an environment in which the client is part of a large organization with numerous versions of the client-developed programs potentially in use at a given point in time.

Example Preparatory Operations for Attestations

Figure 6:
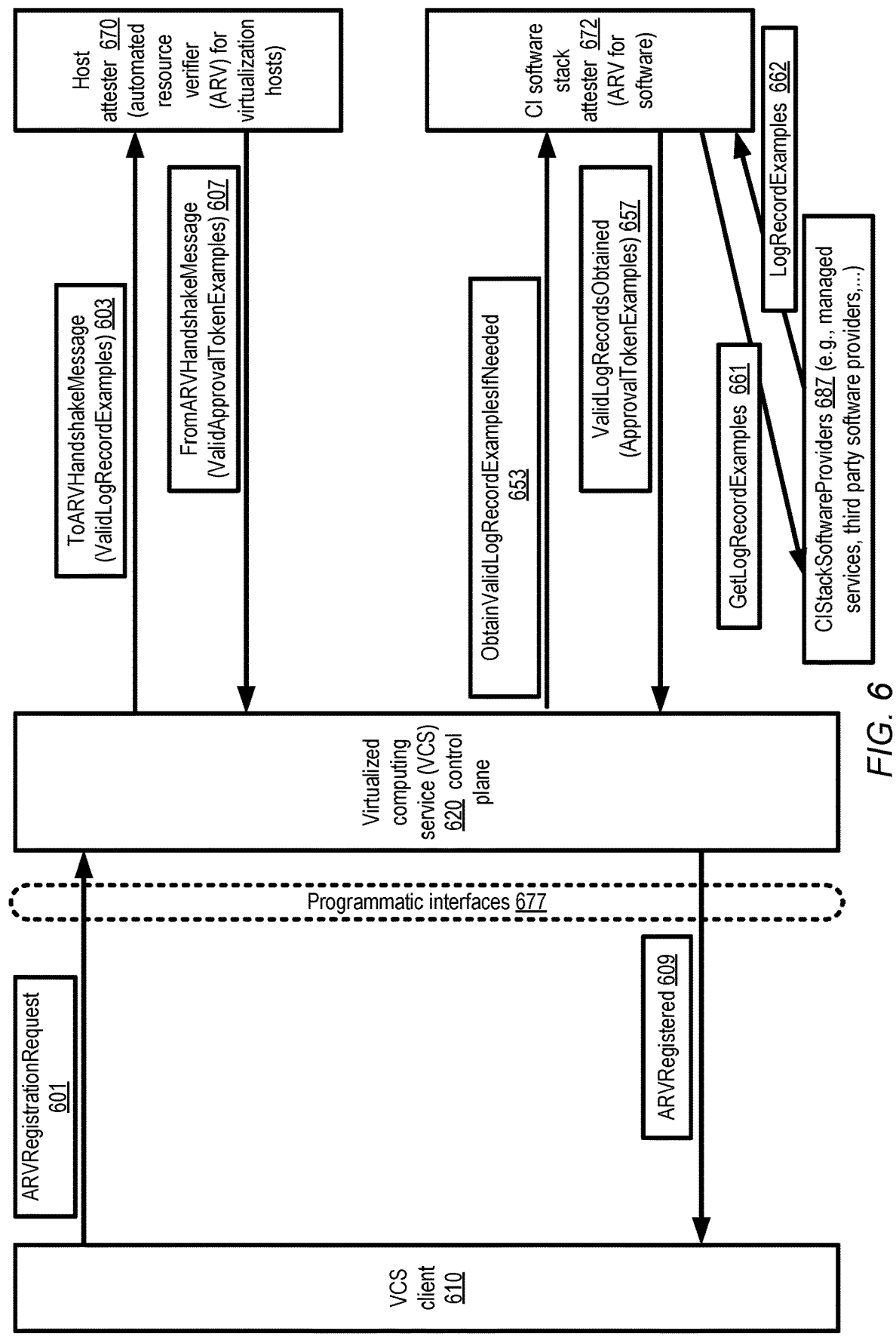
FIG. 6 illustrates an overview of prerequisite operations that may be performed prior to instantiating isolated runtime environments within compute instances whose software components' state is to be attested, according to at least some embodiments.

Before the kinds of attestation workflows introduced herein can be implemented, the verifiers/attesters may have to be provided examples of the kinds of information they should expect to receive in various embodiments to enable them to approve or reject the hosts and/software stacks of the compute instances and IRES. FIG. 6 illustrates an overview of preparatory operations that may be performed prior to instantiating isolated runtime environments within compute instances whose software components' state is to be attested, according to at least some embodiments. Using programmatic interfaces 677 of VCS 620 (such as APIs, command-line tools, graphical user interfaces or a web-based console), a VCS client 610 may submit an ARV registration request 601 in the depicted embodiment, e.g., indicating a network address of host attester 670, an automated resource verifier (ARV) selected by the client for virtualization host attestation. In scenarios in which different ARVs are going to be used for virtualization host attestation and for compute instance software stack attestation, respective registration requests may be sent for each type of ARV. Additional information required to secure communications with the ARV, such as a security key or credential, may also be provided in the registration request 601 in some embodiments. An ARV used for attesting host state may be referred to as a host attester, and an ARV used for attesting the compute instance software may be referred to as a CI software stack attester.

Using the information provided by the client, the control plane of a VCS 620 (similar in features and functionality to VCS 110 of FIG. 1) may initiate a handshake procedure with the client-selected host attester 670 in the depicted embodiment. The number of handshake messages exchanged between the VCS 620 and the host attester 670 may vary in different embodiments. In an example ToARVHandshakeMessage 603, the VCS (e.g., a control plane component of the VCS) may provide examples of valid log messages generated by hardware security devices such as physical TPMs at virtualization hosts as evidence that can be used to attest the host state. Such valid log messages may, for example, be stored in a database of acceptable log messages at the ARV.

In at least some implementations, the host attester 670 may send a FromARVHandshakeMessage 607 during the handshake procedure to the VCS 620, indicating valid examples of host approval tokens and confirming that the earlier handshake message 603 has been received and validated at the ARV. In response to the successful completion of the handshake procedure, host attester 670 may be added to a registry of trusted ARVs within a metadata repository of the VCS in some embodiments. In the embodiment depicted in FIG. 6, an ARVRegistered message 609 may be sent from the VCS to the client 610, indicating that the specified attester has been included in the VCS metadata. According to at least some embodiments, a client 610 may submit an encrypted compute instance machine image to be used for the compute instances and the associated IREs to be set up on attested hosts for the client by the VCS. In at least one embodiment, as mentioned earlier, the decryption of the machine image may require a host approval token from the host attester 670; as such, the machine image indicated by a client may not be used at the VCS until the host at which it is to be used is approved by the host attester. Note that in some embodiments, the machine image may be provided to the VCS before the hoist attester is registered. In at least one embodiment, the machine image to be used to set up the compute instance and the IRE may not necessarily be encrypted.

In at least some embodiments, a somewhat different procedure may be implemented to register CI software stack attesters 672, e.g., partly because examples of the evidence usable to verify the state of CI software components may not necessarily be available at the VCS and may have to be obtained from the providers of the software components. Thus, for example, in response to an ARV registration request 601 pertaining to a CI software stack attester 672, the VCS may send an Obtain ValidLogRecordExamplesIfNeeded message 653 to the CI software stack attester 672. The CI software stack attester 672 may then send a GetLogRecordExamples request 661 to one or more CIStackSoftwareProviders 687 (entities such as the managed task execution services mentioned above whose agents/libraries are to run at the CIs, third-party software providers whose programs are to run at the CIs, and so on. In the case of client-developed software programs that are to run at the CI or the IRE, such a request 661 may be sent to the client if the client has not already provided examples of verification evidence to the attester 672. After receiving examples of the kinds of evidence that may be used to verify the software stacks of the CIs/IREs, e.g., in one or more LogRecordExamples messages 662, the CI software stack attester 672 may send a ValidLogRecordsObtained message 657 to the VCS in the depicted example, indicating that it now has examples that can be used to attest the CI software stack, and providing examples of the kinds of approval tokens the attester is going to send regarding CI stacks. An ARVRegistered message 609 may be sent to the client after the CI software stack attester has been successfully registered. Note that in some embodiments, similar messages may be exchanged between the VCS 620 and the attesters 670 or 672 regarding other types of information (i.e., information other than log records, such as hash values generated from the software programs, etc.) that can be used to verify the states of the virtualization hosts or CI software, with the overall objective being to ensure that (a) an attester has sufficient information to verify the state of the kind of resource for which it is to be used and (b) that the VCS has enough information (such as examples of approval tokens) to be able to confirm that an approval (or disapproval) message for a resource is actually from a registered attester.

Example Attestation Requirements

Figure 7:
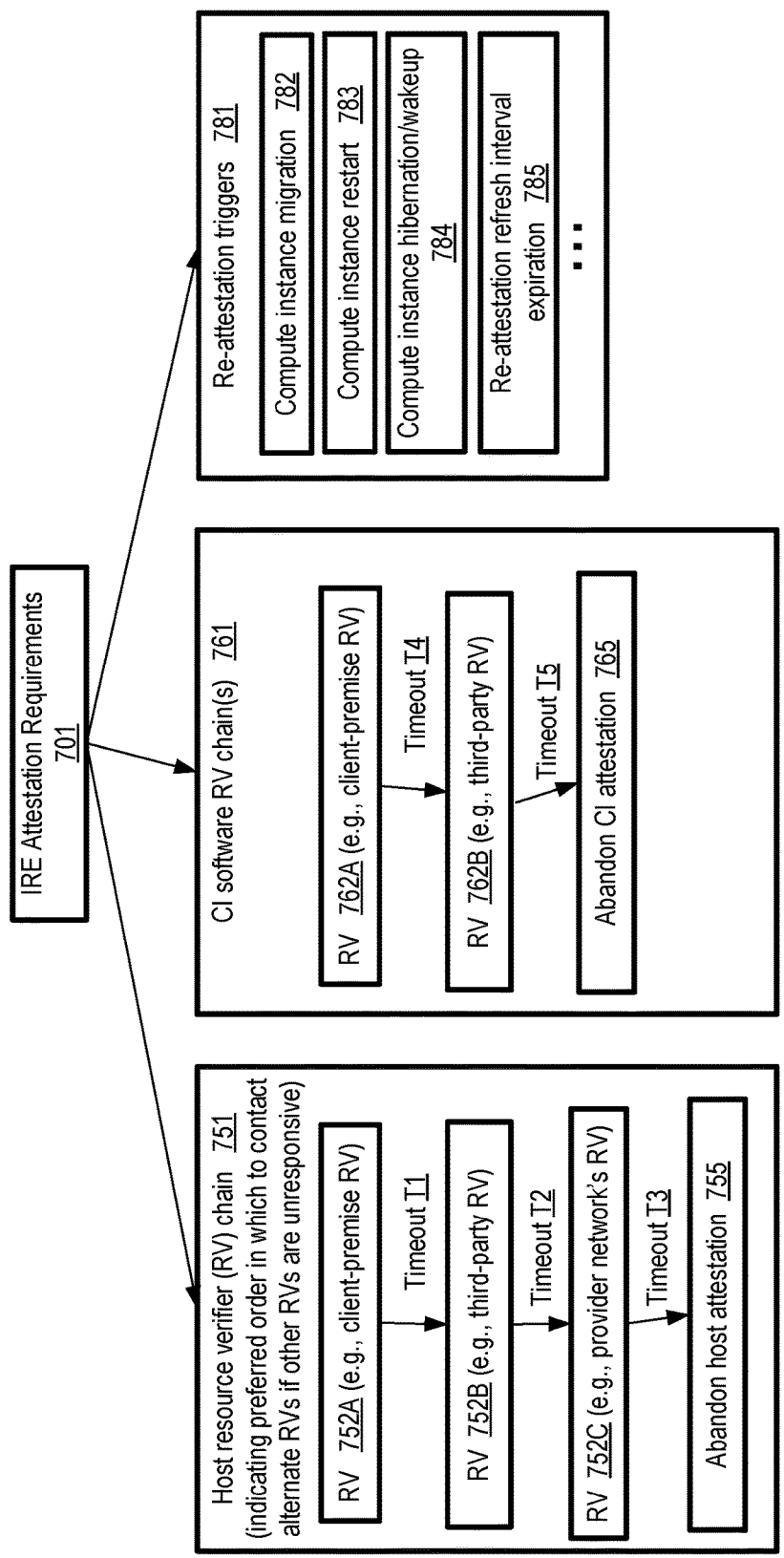
FIG. 7 illustrates example attestation requirement details of isolated runtime environments, according to at least some embodiments.

FIG. 7 illustrates example attestation requirement details of isolated runtime environments, according to at least some embodiments. Attestation requirements 701 may, for example, be indicated in a programmatic request to launch an IRE or a compute instance associated with a CRE in some embodiments. The attestation requirements 701 may include, among other elements, a host resource verifier (RV) chain 751, one or more CI software resource verifier chains 761, and re-attestation triggers 781 in some embodiments. The example host RV chain 751 shown in FIG. 7 includes three RVs, to be consulted in sequence if necessary before the VCS stops attempting to obtain approval regarding a candidate virtualization host using log records and/or other evidence generated at a security device. Network addresses of RVs 752A, 752B and 752C (as well as other metadata usable to establish communications with the RVs from the VCS, such as login credentials, keys or the like) of the chain may be provided by the client in at least some embodiments. The VCS may first attempt to obtain host approval from RV 752A (e.g., an RV set up at a client premise outside the provider network) for a given host identified for the IRE to be launched. If no response is received from RV 752A within a timeout period T1, RV 752B (managed in this example by a third-party approved by the client) may be contacted. If RV 752B also fails to respond, e.g., within a timeout period T2, a third RV 752C (e.g., implemented within the provider network of the VCS) may be contacted. If the third RV also fails to respond within a timeout T3, the attempt to obtain an attestation or approval of the virtualization host may be abandoned in the depicted embodiment, as indicated in element 755.

CI software RV chain 761 may indicate a plurality of RVs to be contacted in sequence to determine whether the software stack of a given CI associated with an IRE is acceptable in the depicted embodiment. For example an RV 762A run at a client premise may be contacted first to verify a CI's software stack in the scenario shown in FIG. 7. If RV 762A fails to respond before a timeout T4 expires, a second RV 762B may be contacted, and if that RV 762B fails to respond within a timeout period T5, the CI attestation may be abandoned as indicated in element 765. Chains of any desired length may be indicated by a client in various embodiments for host and/or CI software verification; the respective timeouts such as T1, T2, T3, T4 and T5 etc. may be selected by the client or by the VCS. In some embodiments, a single chain of RVs may be used for both host and CI software stack verification. In at least one embodiment, a single RV may be used instead of a multi-RV chain for one or both levels of attestation. In some embodiments, a client may specify that instead of relying on a single RV for attesting the virtualization host, a quorum-based approval protocol is to be used, in which information about the host is sent to multiple RVs and the host is approved if at least a specified number of the RVs provide respective affirmative attestation (i.e., an indication that the RV approves the host). Similarly, in at least one embodiment, a client may specify that instead of relying on a single RV for attesting the CI, a quorum-based approval protocol is to be used, in which information about the CI software stack is sent to multiple RVs and the CI software stack is approved if at least a specified number of the RVs provide respective affirmative attestation (i.e., an indication that the RV approves the software stack).

Attestation requirements 701 may also optionally include a list of one or more re-attestation triggers 781 in some embodiments, indicating respective scenarios or conditions under which the configuration of a virtualization host being used (or to be used) for an IRE, or the software stack of the CI or IRE being used, is to be re-verified or re-attested. For example, in some embodiments, if and when the associated compute instance and/or the IRE is migrated to another virtualization host, the migration 782 may only be permitted if the destination virtualization host (the host to which the IRE is being moved) is pre-approved by an RV of the RV chain 751. In such an embodiment, evidence such as log records generated by a security device of the destination virtualization host may be provided to the RV as a prerequisite for migration, and the IRE may be migrated after an automated approval message or token is received from an RV of the chain. In one embodiment, a client may wish to have the virtualization host configuration verified, and/or the software stack verified, at every compute instance restart/reboot 783, and/or every time the compute instance undergoes a hibernation/wakeup cycle 784. In at least some embodiments, a client may wish to schedule re-attestations of the host and/or the CI software stack periodically (e.g., after an expiration of a refresh interval 785 selected by the client), independently of whether/when lifecycle transitions such as migrations, restarts, hibernations etc. are scheduled.

Example Programmatic Interactions

Figure 8:
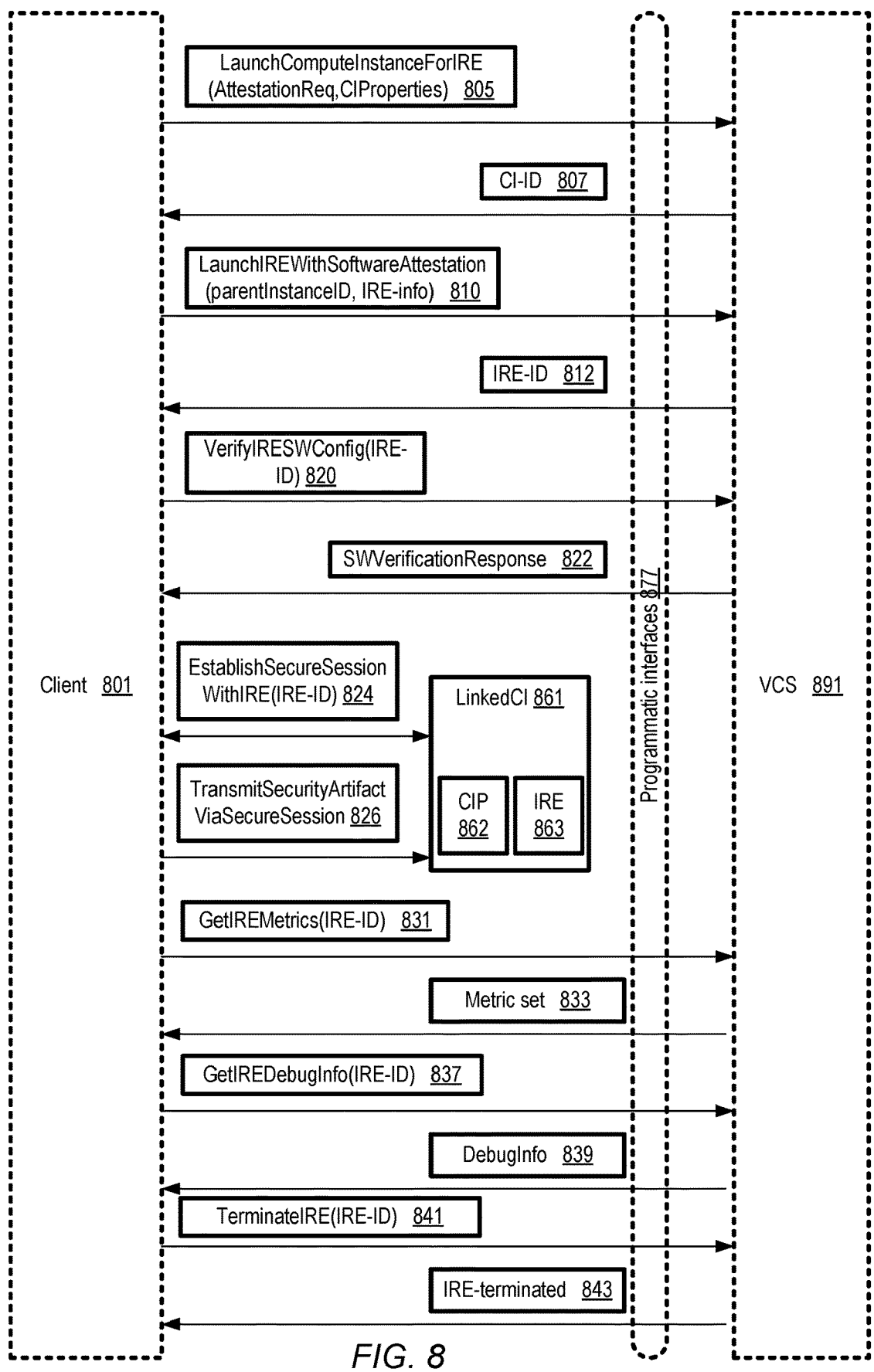
FIG. 8 illustrates example programmatic interactions associated with attestation of hardware and software used for isolated runtime environments, according to at least some embodiments.

FIG. 8 illustrates example programmatic interactions associated with attestation of hardware and software used for isolated runtime environments, according to at least some embodiments. The kinds of interactions illustrated in FIG. 8 may be supported by a VCS 891, similar in features and functionality to VCS 110 of FIG. 1, in addition to the registration-related programmatic interactions discussed in the context of FIG. 6 in at least one embodiment. VCS 891 may implement a set of programmatic interfaces 877, such as web-based consoles, command-line tools, graphical user interfaces, application programmatic interfaces (APIs) and the like in the depicted embodiment, which may be used for the interactions.

In some embodiments, a two-step approach may be employed with regard to instantiating or launching isolated runtime environments or IREs. A client 801 may first submit a request to launch a compute instance with which an IRE is to be linked (e.g., a LaunchComputeInstanceForIRE request 805) to the VCS 891, and then later issue a separate request to launch the IRE (e.g., a LaunchIREWithSoftwareAttestation request 810) associated with the compute instance (CI). In such an approach, automated pre-attestation requirements (if any) for the virtualization host may be indicated (e.g., via the AttestationReq parameter), and various desired characteristics of the parent compute instance may be indicated (e.g., via the CIProperties parameter) in the first of the two requests. For example, if host attestation of the kind discussed earlier is desired, the AttestationReq parameter may indicate one or more client-selected pre-registered host resource verifiers. In some implementations, the identities of pre-registered software stack verifiers may also be indicated via the AttestationReq parameter. The CIProperties parameter may be used to indicate, for example, the memory size of the desired compute instance, the kind of operating system to be used for the compute instance, etc. After the VCS has launched a CI with the requested properties, an identifier CI-ID 807 of the compute instance may be provided to the client.

The CI identifier (CI-ID) may be included in the LaunchIREWithSoftwareAttestation request 810 to launch the IRE in the depicted embodiment, e.g., along with information (IRE-info) about the contents and configuration of the IRE itself, such as the amount of the parent CI's memory and/or other resources to be set aside for the IRE. In some embodiments a pointer to an executable object such as a virtual machine image or a software container executable to be used in the IRE may be provided as a parameter of the LaunchIREWithSoftwareAttestation request. In at least one embodiment, a program to be launched as the IRE may be transferred to the parent compute instance by the client 801 before the LaunchIREWithSoftwareAttestation request is submitted, and an indicator of the name or location of the program may be provided in the IRE-info parameter. In some embodiments in which this two-step procedure is used, the virtualization host may be attested by a first client-selected resource verifier prior to the launch of the compute instance associated with the IRE, while attestation of the state of the software of the IRE and the compute instance itself (e.g., by another client-selected resource verifier or the first client-selected resource verifier) may be deferred until the LaunchIREWithSoftwareAttestation is received and processed. In some embodiments, if a different resource verifier is to be used for software attestation than was used for host attestation, identification information of the software resource verifier may be provided in the LaunchIREWithSoftwareAttestation request, e.g., using a parameter similar to the AttestationReq parameter of the LaunchComputeInstanceForIRE request. An identifier of the IRE (IRE-ID 812) may be returned to the client after the IRE is instantiated in some embodiments. In other embodiments, instead of a two-step IRE establishment procedure, a single request (e.g., a LaunchSoftwareAttestedIREAtAttestedHost request) may be used to launch both the compute instance and its associated IRE, in effect combining the requests 805 and 810 into a single request. Note that in some embodiments, clients may choose the particular combinations of attestation they wish to use: e.g., they may submit one or more programmatic requests to (a) launch IREs, without software attestation enabled, at attested hosts, or (b) launch IREs, with software attestation enabled, at un-attested hosts.

A VerifyIRESWConfig request 820 may be submitted by a client 801 to initiate the process of attestation/analysis/verification of the software state of the IRE and/or its associated compute instance in some embodiments, with an identifier of the IRE being included as a parameter of the request. In response, a virtualization management component of the host at which the IRE is set up may cause the software state of the compute instance and the IRE to be verified with the help of an emulated security device, and generate a response (SWVerificationResponse 822) in such embodiments. The SWVerificationResponse 822 may include the results of the attestation/analysis/verification, as well as evidence of the identity of the security manager, the IRE and/or the parent compute instance in some embodiments.

A client 801 may establish a secure communication session or channel with the IRE, e.g., using one or more messages indicated by EstablishSecureSessionWithIRE 824. A handshake protocol conceptually similar to a TLS session establishment handshake may be employed in some embodiments—e.g., both parties to the session may obtain indications of the other party's identity, agree on a ciphersuite to be used, and so on. Messages of the handshake originating at the client 801 may be transmitted to a communication intermediary process CIP 862 of the compute instance (LinkedCI) 861 associated with the IRE, and from that CIP to the IRE 863; messages from the IRE 863 to the client may take the reverse path. After the secure communication session has been established, one or more security artifacts may optionally be transmitted by the client to the IRE in one or more messages (indicated by TransmitSecurityArtifactViaSecureSession 826) of the session, e.g., in encrypted form such that the artifacts cannot be extracted or obtained by any software of the associated CI other than software running in the IRE. After the artifacts have been decrypted at the IRE, computations of the client's application that require the use of the artifact may be performed at the IRE in various embodiments as discussed above.

Clients 801 may request metrics pertaining to an IRE, such as resource utilization metrics, data transfer metrics, etc., specific to the IRE and the like using a GetIREMetrics request 831 in some embodiments, and the requested metric sets 833 may be provided by the VCS in response. In some embodiments, debugging information of an IRE (e.g., a call stack associated with a process that exited unexpectedly, or a dump of memory of the IRE) may be requested via a GetIREDebugInfo request 837, and the requested information may be provided if available via a DebugInfo message 839. In at least some embodiments, a client may request, via a TerminateIRE request 841, that a particular IRE be shut down or killed. Such a termination may be performed, and an IRE-terminated response 843 may be provided in some such embodiments. Note that other types of programmatic interactions associated with isolated runtime environments may be supported in at least some embodiments, and some of the types of requests shown in FIG. FIG. 6 or FIG. 8 may not be supported in at least one embodiment.

Method for Configuring and Using IREs

Figure 9:
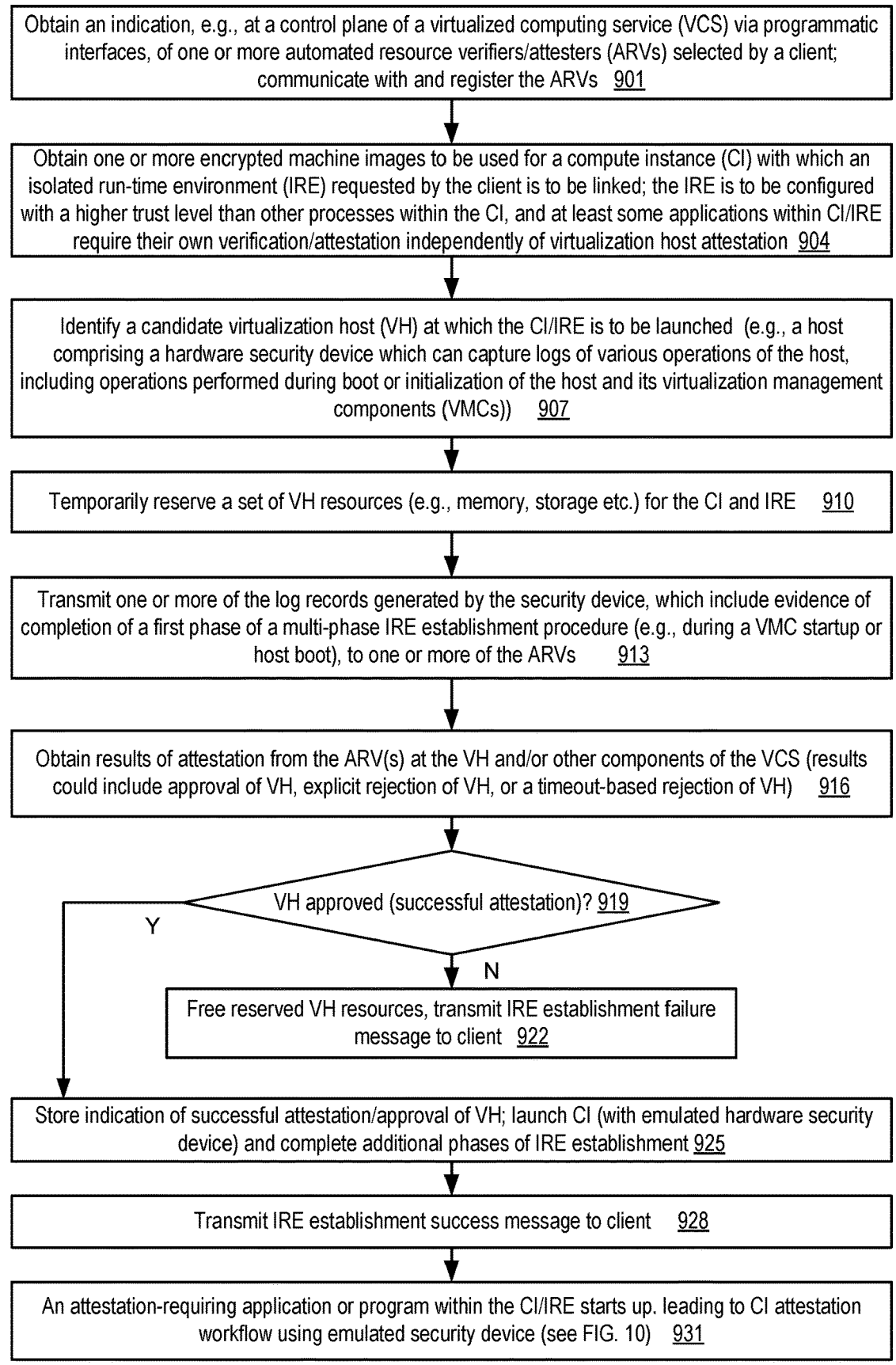
FIG. 9 and FIG. 10 are flow diagrams illustrating aspects of operations that may be performed to verify the states of hardware and software used for running secure computations within isolated runtime environments, according to at least some embodiments.
Figure 10:
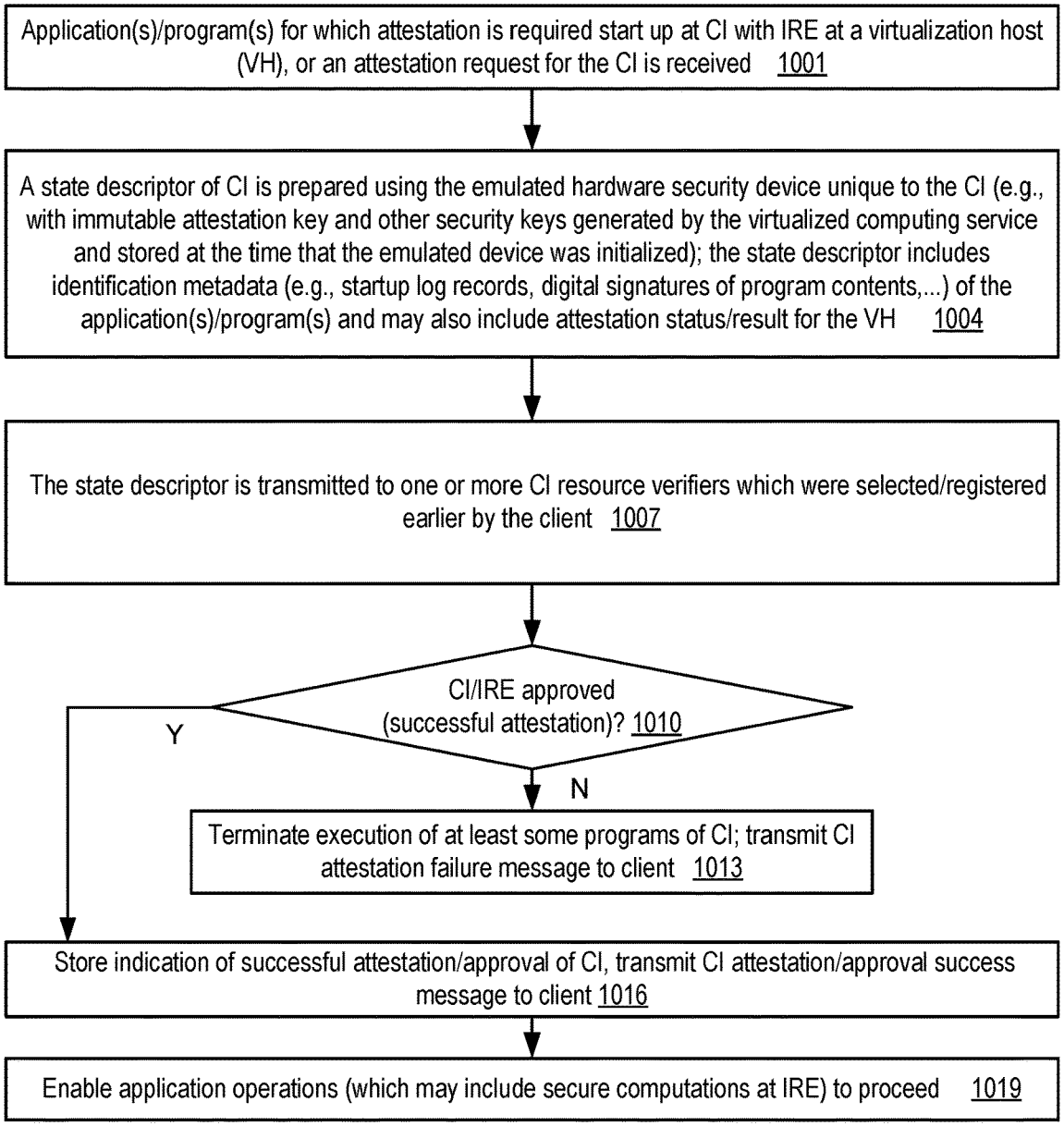

FIG. 9 and FIG. 10 are flow diagrams illustrating aspects of operations that may be performed to verify the states of hardware and software used for running secure computations within isolated runtime environments, according to at least some embodiments. As shown in element 901 of FIG. 9, an indication of one or more automated resource verifiers (ARVs) selected by a client may be obtained at a VCS similar in features and functionality to VCS 110 of FIG. 1, e.g., via programmatic interfaces of the VCS control plane. A wide variety of ARVs may be specified by a client for verifying host state and/or software stacks, including some that comprise programs running at client-owned or client premises, others that comprise programs run using third-party resources or premises, and/or ARVs that include programs run at a service of the provider network of which the VCS is a part. In one embodiment, one or more chains of ARVs similar to that discussed in the context of FIG. 10 may be specified by a client, indicating a preferred order in which alternate ARVs are to be requested to provide host approval if other ARVs are non-responsive, and the timeout intervals after which such alternate requests are to be initiated. In response to receiving the information (including for example network addresses) of the client's preferred ARVs, the VCS may initiate procedures to register the ARVs, similar to the procedure discussed in the context of FIG. 6. In such procedures, in some embodiments, examples of log messages or other artifacts that can be used by the ARVs to attest or approve the configuration of a candidate virtualization host for an IRE, and the software programs/applications run at the CI or the IRE may be provided to the ARVs. The ARVs in turn may provide examples of approval tokens/messages for the host and the software programs/applications to the VCS. At the end of the registration procedure, the ARVs may be included in a registry or list of trusted ARVs maintained for various clients at the VCS in various embodiments.

A client may provide an indication, to the VCS via a programmatic interface, of one or more encrypted machine images to be used for a compute instance (CI) with which an IRE requested programmatically by the client is to be linked via a secure local (on-host) communication channel in the depicted embodiment (element 904). The IRE may represent an execution environment at a higher trust level than the other processes running within the parent compute instance. In at least some embodiments, the establishment of the IRE may involve multiple phases of operations, some performed during the boot/initialization of the virtualization host being used for the IRE, and some performed later. In the depicted embodiment, at least some applications/programs of the software stack run at the IRE and/or its associated CI may have to be verified/attested independently of the attestation of the virtualization host or server used for the IRE and the CI.

A candidate virtualization host (VH) at which a CI/IRE combination is to be set up for the client may be identified at the VCS (element 907), e.g., in response to a programmatic launch request. If the VCS determines that attestation of the VH is required (e.g., based on preferences or parameters provided by the client), a candidate VH that includes a hardware security device (e.g., similar to a trusted platform module or TPM) which logs various operations may be selected in some embodiments. For example, the security device may record operations performed during the boot/initialization processes of the VH and/or its virtualization management components (VMCs), which may provide evidence that a preliminary or first phase of establishment of the IRE has been successfully completed.

In some embodiments, a set of VH resources (e.g., memory, storage, virtual CPUs, etc.) that may be used by the CI may be reserved temporarily (element 910). Such reserved resources may be allocated to the CI if the candidate VH is approved by an ARV selected by the client; if such approval is not obtained in a timely manner (e.g., based on timeout values selected by the VCS and/or the client), the reserved resources may later be freed as indicated in element 922. A set of log records generated by the hardware security device, indicating that at least one phase of IRE establishment has been completed, may be transmitted to one or more of the ARVs (element 913) in the depicted embodiment. The first phase may, for example, be executed during the boot or startup phases of the virtualization host and/or its VMCs in some embodiments.

Explicit or implicit results of the log-records-based attestation/verification at the ARV(s) may be obtained at the candidate VH (element 916) in various embodiments, e.g., either directly or via the VCS control plane. Explicit results may include, for example, one or more approval messages/tokens (in some implementations including a cryptographic key that can be used to decrypt a machine image), and/or a message rejecting the candidate virtualization host. If no response is received from the ARV(s) within a selected timeout interval, and all available ARVs indicated by the client have been exhausted, this may be considered an implicit rejection of the candidate VH in at least some embodiments. If the candidate VH is approved or affirmatively attested (as detected in operations corresponding to element 919), the CI may be launched at the candidate VH, and additional phases of CI and IRE establishment may be performed (element 925). Such additional phases may include the configuration of the secure communication channel between a component of the CI (e.g., a communication intermediary process similar to CIP 248 of FIG. 2) and the IRE in the depicted embodiment. In various embodiments, a record of the attestation state of the candidate VH (e.g., whether it was approved or not, and if not, why not) may be stored at the VH and/or at the VCS control plane. If the VH is not approved, resources that were previously reserved for the CI (if any) may be released or freed, and an IRE establishment failure message may be sent to the client on whose behalf the IRE was to be established in some embodiments (element 922).

In at least some embodiments, as part of the configuration of the CI, a set of software-emulated devices (referred to as a virtual motherboard or a device model) may be created by the VMCs of the VH, including an emulated hardware security device such as an eTPM. Configuration of the software-emulated security device may, for example, including storing one or more immutable cryptographic keys selected by a key source of the provider network at which the VCS is implemented, such as a key management service or a security service. A message indicating that the requested IRE has been established may be sent to the client in some embodiments (element 928).

After the CI and its associated IRE are established, one or more applications/programs in the software stack of the CI or IRE which require verification/attestation may be started up, leading to a CI attestation workflow which involves the use of the emulated security device (element 931).

FIG. 10 illustrates aspects of such a CI attestation workflow, according to some embodiments. One or more triggering conditions may lead to the attestation (or re-attestation) of portions or all of the software stacks of a CI and/or its associated IRE in different embodiments. For example, one such trigger may include a detection that an application or program for which attestation is required is being started up for the first time at the CI or IRE (element 1001). In at least some embodiments, a client may specify to the VCS (e.g., as part of registration requests for resource verifiers, or in other messages) the programs/applications of the CI and/or IRE whose state is to be verified. In other embodiments, the VCS may determine which programs/applications are to be verified based on the behavior of the programs/applications at startup—e.g., if an application pauses after it is started up and indicates that a key from a resource verifier is needed to proceed with further execution, this may signal that the application is to be attested. The reception of an explicit software stack attestation request (or re-attestation request) from a client represents another example of a trigger for initiating attestation in the depicted embodiment.

A state descriptor of the CI may be prepared using the emulated hardware security device unique to the CI (e.g., with immutable attestation key and other security keys generated by the virtualized computing service and stored at the time that the emulated device was initialized), e.g., by VMCs of the VH, in response to the triggering condition in various embodiments (element 1004). The state descriptor may include one or more types of identification metadata (e.g., startup log records of the application generated in the early phases of their startup, digital signatures of program contents, etc.) of the application(s)/program(s) to be attested. In at least one embodiment, the state descriptor may also include attestation status/result for the VH which were obtained earlier, or (in some cases) an indication that the attestation of VH state was not attempted.

The state descriptor may be transmitted to one or more CI resource verifiers selected and/or registered earlier, e.g., from the VMCs or the VCS control plane (element 1007). The CI resource verifier may examine the contents of the state descriptor and send a response indicating whether the CI and the IRE are approved or not. Note that depending on the rules/logic used by the verifier and the instructions provided by the client to it, the CI may in some embodiments be rejected as untrustworthy if the state descriptor does not provide an indication that the VH itself has been attested successfully within some recent time period; that is, in order to attest the state of the CI, both the attestation state of the VH and the state of the CI's software may be taken into account in such embodiments. In other embodiments, the attestation state of the VH may not be taken into account when determining whether to approve the CI or not.

If the CI/IRE is not approved (as detected in operations corresponding to element 1010), in at least some embodiments the programs/applications which were being verified may be terminated (element 1013) and an indication that the CI attestation failed may be provided to the client. If the CI/IRE combination is approved, an indication of the successful attestation of the CI/IRE may be stored (element 1016) and a message indicative of the successful attestation may be provided to the client in the depicted embodiment. Based on the successful attestation, application/program operations may be allowed to proceed at the CI and the IRE (element 1019). These operations may include computations performed using security artifacts stored at the IRE and inaccessible outside the IRE in various embodiments. In at least some implementations, the approval messages from the CI resource verifiers may include keys or other artifacts which enable the further execution of the programs/applications being attested; without such keys or artifacts, the applications' execution may not be able to proceed in such implementations.

It is noted that in various embodiments, some of the operations shown in FIG. 9 and/or FIG. 10 may be implemented in a different order than that shown in the figures, or may be performed in parallel rather than sequentially. Additionally, some of the operations shown in FIG. 9 and/or FIG. 10 may not be required in one or more implementations.

Illustrative Computer System

Figure 11:
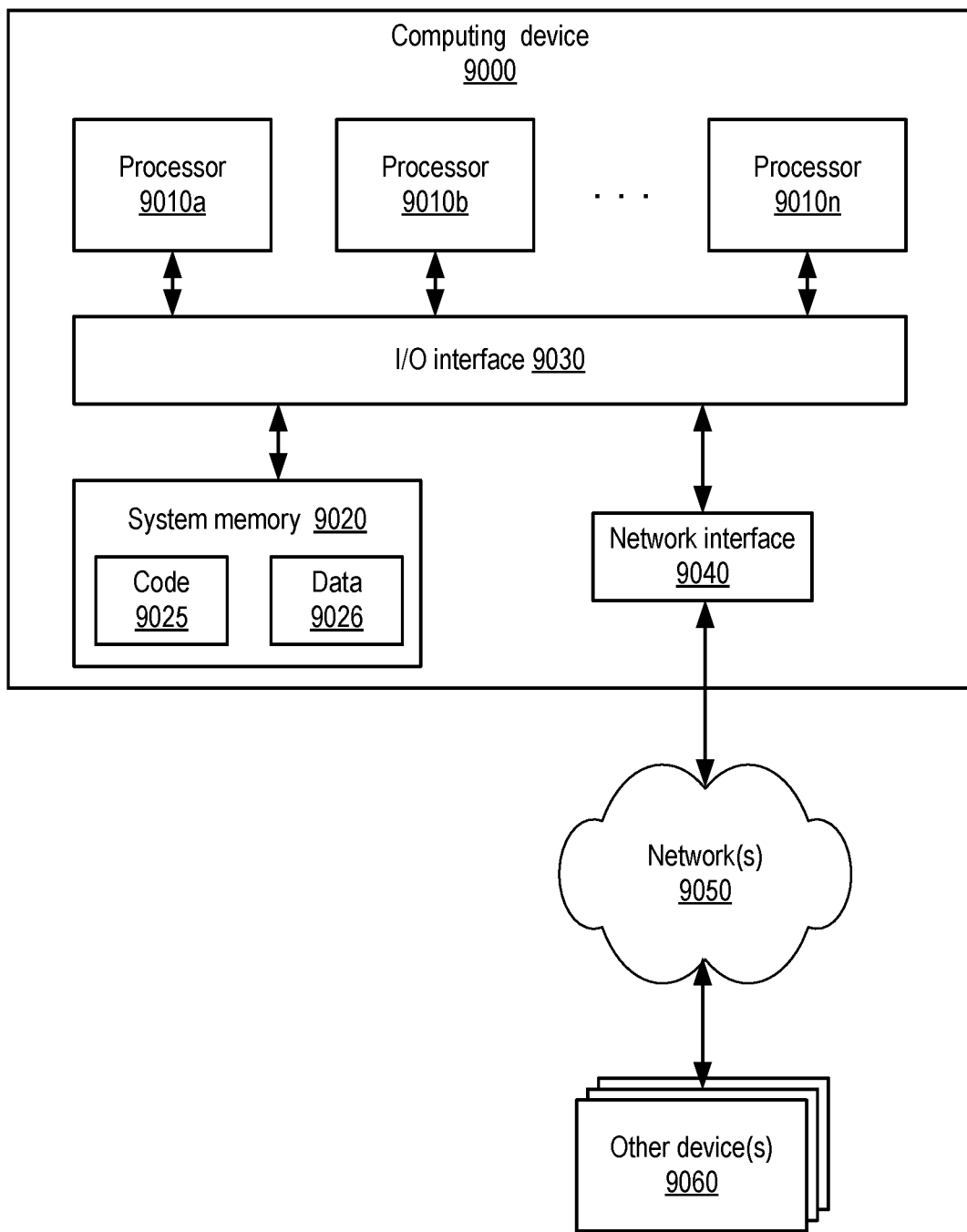
FIG. 11 is a block diagram illustrating an example computing device that may be used in at least some embodiments.

In at least some embodiments, a server that implements the types of techniques described herein (e.g., various functions of a virtualized computing service, other services of a provider network and/or automated resource verifiers/attesters) may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
obtain, at a virtualized computing service of a provider network, a request to establish an isolated runtime environment to run secure computations on behalf of a client of the virtualized computing service;
in response to the request, configure, using a virtualization management component of a selected virtualization server of the virtualized computing service, one or more software-emulated devices for a compute instance linked to the isolated runtime environment via a secure communication channel, wherein the one or more software-emulated devices include an emulated trusted platform module (eTPM), wherein configuration of the eTPM comprises storing one or more immutable cryptographic keys selected by a key source of the provider network for the eTPM;
detect an attempt to execute, in the isolated runtime environment, one or more software programs in a software stack of the compute instance;
in response to the detection of the attempt to execute the one or more software programs, generate a state descriptor of at least the compute instance, wherein the state descriptor includes (a) an indicator of an attestation status of the selected virtualization server as a trusted resource for instantiating the isolated runtime environment and (b) software identification metadata that indicates the one or more programs in the software stack, wherein the indicator of an attestation status of the selected virtualization server is obtained without using the eTPM and the software identification metadata is prepared using the eTPM;

cause the state descriptor to be transmitted via the provider network to one or more network addresses of one or more compute instance attestation services external to the selected virtualization server; and subsequent to a receipt of an approval from the one or more compute instance attestation services, cause at least some of the secure computations to be performed using the one or more programs.

2. The system as recited in claim 1, wherein the one or more programs of the software stack comprise an agent which invokes one or more programmatic interfaces of a service of the provider network to implement a task indicated by a client on whose behalf the isolated runtime environment is established.

3. The system as recited in claim 1, wherein configuration of the eTPM comprises initializing one or more user-mode data structures.

4. The system as recited in claim 1, wherein the one or more computing devices include further instructions that upon execution on or across the one or more computing devices further cause the one or more computing devices to:

obtain, via one or more programmatic interfaces, one or more of: (a) an indication of a compute instance attestation service of the one or more compute instance attestation services or (b) an indication of a server attestation service from which the attestation status of the selected virtualization server is obtained.

5. The system as recited in claim 1, wherein the state descriptor comprises one or more of: (a) a log record generated during an initialization phase of a program of the software stack, or (b) an indication of one or more software patches which have been applied to a program of the software stack.

6. A computer-implemented method, comprising:

configuring, at a virtualization server of a virtualized computing service of a provider network, one or more software emulated devices for a first compute instance associated with a first isolated runtime environment, wherein the one or more software emulated devices include a first emulated hardware security module, wherein configuration of the first emulated hardware security module comprises storing one or more cryptographic keys identified on behalf of the virtualized computing service for the first emulated hardware security module;

detecting an attempt to execute, in the first isolated runtime environment, a software program in a software stack of the first compute instance;

in response to the detection of the attempt to execute the software program, transmitting, via the provider network to one or more network addresses of one or more resource verifiers external to the virtualization server, a state descriptor of the first compute instance, wherein the state descriptor is prepared and signed using the first emulated hardware security module, wherein the state descriptor includes software identification metadata that identifies the software program to be executed within the first compute instance, and wherein the software identification metadata indicates whether one or more software patches or updates have been applied to the software program; and in response to a receipt of an approval of the state descriptor from the one or more resource verifiers, enabling one or more computations to be performed at the first compute instance using the software program.

7. The computer-implemented method as recited in claim 6, wherein the software program identified by the software identification metadata invokes one or more programmatic interfaces of a service of the provider network to run another software program selected by a client on whose behalf the first isolated runtime environment is established.

8. The computer-implemented method as recited in claim 7, wherein the other software program comprises one or more of: (a) a client-specified function run at a server-less event-driven computing service of the provider network, (b) a software container run at a container-based computing service of the provider network, or (c) an analytics program run at an analytics service of the provider network.

9. The computer-implemented method as recited in claim 6, wherein configuration of the first emulated hardware security module comprises initializing one or more user-mode data structures of a virtualization management component of the virtualization server.

10. The computer-implemented method as recited in claim 6, wherein configuration of the first emulated hardware security module comprises initializing one or more kernel-mode data structures of a second isolated runtime environment configured within a virtualization management component of the virtualization server.

11. The computer-implemented method as recited in claim 6, wherein the configuration of the first emulated hardware security module comprises establishing a chain of trust from the first emulated hardware security module to a physical hardware security module of the virtualization server.

12. The computer-implemented method as recited in claim 6, further comprising:

in response to determining that the first compute instance is to be migrated to another virtualization server,
generating an encrypted version of at least a portion of state information of the first emulated hardware security module; and
storing the encrypted version within memory allocated to the first isolated runtime environment prior to migration of the first compute instance.

13. The computer-implemented method as recited in claim 6, further comprising:

configuring, at the virtualization server, a second emulated hardware security module corresponding to a second compute instance of the virtualization server, wherein configuration of the second emulated hardware security module comprises storing one or more other cryptographic keys identified on behalf of the virtualized computing service for the second emulated hardware security module.

14. The computer-implemented method as recited in claim 6, wherein the state descriptor includes an indication of whether a state of the virtualization server was attested by another resource verifier prior to generation of the state descriptor.

15. The computer-implemented method as recited in claim 6, wherein the state descriptor is generated based at least in part on a log record generated during an initialization phase of one or more programs of the software stack.

16. One or more non-transitory computer-accessible storage media storing program instructions that when executed on or across one or more processors cause the one or more processors to:

configure, at a virtualization host of a virtual computing service of a provider network, an emulated hardware security module for a compute instance of the virtualization host;

detect an attempt to execute a software program in a software stack of the compute instance;

in response to the detection of the attempt to execute the software program, transmit, via the provider network to one or more network addresses of one or more resource verifiers external to the virtualization host, a state descriptor of the compute instance, wherein the state descriptor is prepared and signed using the emulated hardware security module, wherein the state descriptor includes software identification metadata that identifies the software program to be executed at the compute instance, and wherein the software identification metadata indicates whether one or more software patches or updates have been applied to the software program; and in response to a receipt of a response pertaining to the state descriptor from the one or more resource verifiers, determine whether to execute the software program at the compute instance.

17. The one or more non-transitory computer-accessible storage media as recited in claim 16, storing further program instructions that when executed on or across one or more processors further cause the one or more processors to:

obtain an indication, via a programmatic interface, that a software enclave is to be established, wherein the emulated hardware security module is configured in response to the indication.

18. The one or more non-transitory computer-accessible storage media as recited in claim 16, storing further program instructions that when executed on or across one or more processors further cause the one or more processors to:

cause, using a cryptographic key included in the response, at least a portion of the software program to be executed.

19. The one or more non-transitory computer-accessible storage media as recited in claim 16, storing further program instructions that when executed on or across one or more processors further cause the one or more processors to:

obtain, via one or more programmatic interfaces, an indication of a resource verifier of the one or more resource verifiers.

20. The one or more non-transitory computer-accessible storage media as recited in claim 16, storing further program instructions that when executed on or across one or more processors further cause the one or more processors to:

obtain, after the receipt of the response, a request via a programmatic interface to initiate re-verification of the compute instance; and cause to be transmitted, to the one or more resource verifiers, an updated version of the state descriptor generated using the emulated hardware security module.

* * * * *